United States Patent [19]

Schaefer et al.

[11] Patent Number: 5,385,980

[45] Date of Patent: Jan. 31, 1995

[54] CURABLE HALOBUTYL RUBBER/POLY-EPIHALOHYDRIN RUBBER BLENDS

[75] Inventors: Ronald J. Schaefer, Medina, Ohio; Vernon L. Kyllingstad, Floyds Knobs, Ind.

[73] Assignee: Zeon Chemicals U.S.A., Inc., Louisville, Ky.

[21] Appl. No.: 216,243

[22] Filed: Mar. 22, 1994

Related U.S. Application Data

[63] Continuation of Ser. No. 897,352, Jun. 11, 1992, abandoned.

[51] Int. Cl.$^6$ .................. C08L 15/02; C08L 9/00; C08L 23/28; C08L 71/03
[52] U.S. Cl. .................. 525/187; 525/192; 525/194; 525/214; 525/215; 525/346; 525/349; 525/350; 525/351; 525/352; 525/374
[58] Field of Search ............ 525/187, 192, 194, 214, 525/215, 346, 349, 350, 351, 352, 374, 379, 382

[56] References Cited

U.S. PATENT DOCUMENTS

| | | | |
|---|---|---|---|
| 1,912,448 | 6/1933 | Harkins | 525/350 |
| 2,906,313 | 9/1959 | Ford | 525/346 |
| 2,962,474 | 11/1960 | Fusco et al. | 525/349 |
| 3,158,591 | 11/1964 | Vandenberg | 525/349 |
| 3,586,087 | 6/1971 | Messerly et al. | 525/187 |
| 3,632,840 | 1/1972 | Vandenberg | 525/403 |
| 3,649,715 | 3/1972 | Oetzel | 525/187 |
| 3,787,376 | 1/1974 | Nakamura et al. | 525/404 |
| 4,128,510 | 12/1978 | Richwine | 525/349 |
| 4,136,084 | 1/1979 | Diek et al. | 528/481 |
| 4,157,425 | 6/1979 | Diek et al. | 521/95 |
| 4,288,576 | 9/1981 | Richwine | 525/349 |
| 4,357,446 | 11/1982 | Matoba | 525/349 |
| 4,511,698 | 4/1985 | Matoba et al. | 525/187 |
| 4,519,430 | 5/1985 | Ahmad et al. | 524/571 |
| 4,551,505 | 11/1985 | Sauerbier et al. | 525/346 |
| 4,587,302 | 5/1986 | Berta | 525/237 |
| 4,591,617 | 5/1986 | Berta | 525/187 |
| 4,616,686 | 10/1986 | Berta | 152/510 |
| 4,616,687 | 10/1986 | Berta | 152/510 |
| 4,624,989 | 11/1986 | Berta | 525/187 |
| 4,655,962 | 4/1987 | Rowland et al. | 521/92 |
| 4,692,475 | 9/1987 | Rowland et al. | 521/92 |
| 4,885,341 | 12/1989 | Aonuma et al. | 525/187 |
| 4,900,490 | 2/1990 | Kozuna | 521/81 |
| 5,053,438 | 10/1991 | Kozuna | 521/81 |

OTHER PUBLICATIONS

"Chemical Abstracts", vol. 103, 1985, 55232c.
"Chemical Abstracts", vol. 103, 1985, 7571r.
"Crosslinking of epichlorohydrin elastomers", H. Ehrend, *Rubber World*, May 1985, pp. 29–31, 34–35.
"Special-Purpose Elastomers", V. L. Kyllingstad, Hercules Incorporated, New York Rubber Group, Education Series 1982, presented Apr. 21, 1982.
"Materials Safety Data Sheet" re Rhenofit UE, dated Dec. 4, 1990, from RheinChemie Corporation.

*Primary Examiner*—James J. Seidleck
*Assistant Examiner*—M. L. Warzel
*Attorney, Agent, or Firm*—Armstrong, Westerman, Hattori, McLeland & Naughton

[57] ABSTRACT

A curable halobutyl rubber/polyepihalohydrin rubber blend comprises a cure system consisting essentially of (a) sulfur, (b) sulfur accelerator, (c) zinc-containing promoter, (d) urea or urea derivative vulcanization accelerator and, optionally, (e) di- or tri-mercapto non-sulfur curative such as 2,4,6-trimercapto-1,3,5-triazine. The halobutyl rubber/polyepi-halohydrin rubber blends that are crosslinked with the cure system of this invention exhibit excellent scorch safety and cure rate, as well as a high degree of crosslinking, and are useful in the manufacture of tire inner tubes and inner liners.

26 Claims, 16 Drawing Sheets

CURABLE HALOBUTYL RUBBER/POLY-EPIHALOHYDRIN RUBBER BLENDS

RELATED APPLICATION

This application is a continuation of application Ser. No. 07/897,352 filed Jun. 11, 1992, now abandoned, which is related to Ser. No. 07/897,092, filed by the applicants herein on even date herewith, and abandoned and entitled "Cure System For Halobutyl Rubber-Containing Compositions."

BACKGROUND OF THE INVENTION

This invention relates to curable compositions containing halobutyl rubber, and a cure system comprising (a) sulfur, (b) a sulfur accelerator, (c) a zinc-containing promoter, (d) urea, a urea derivative or mixtures thereof and, optionally, (e) a di- or tri-functional mercapto compound nonsulfur curative. This invention also relates to crosslinked materials formed from the curable compositions of this invention. The crosslinked materials formed in accordance with this invention have an excellent balance of cure rate, degree of crosslinking, scorch safety and physical properties, and exhibit excellent tire carcass adhesion as is useful in tire inner liners, as well as excellent impermeability to gases which is highly useful in tire inner tubes and inner liners for pneumatic tires.

Tire liners based on blends of halobutyl rubber, especially chlorobutyl rubber, with hydrocarbon backbone rubber, such as natural rubber or reclaimed butyl rubber or both, generally exhibit acceptable gas impermeability characteristics, but they experience difficulty due to sensitivity to entrapment of gases, particularly air. As is disclosed, for example in U.S. Pat. No. 3,586,087, the impermeability of tire liners based on such blends can be improved by adding an epichlorohydrin rubber to the blend. However, while the addition of an epichlorohydrin rubber to halobutyl rubber-based blends results in tire liner compositions having good air impermeability, the resulting compositions often are not characterized by a good balance of cure rate, scorch safety and physical properties, and generally do not adhere satisfactorily to tire carcasses.

In order to improve the physical characteristics of tire liner compositions comprised of blends of halobutyl rubber and epihalohydrin rubber, it has been disclosed in U.S. Pat. No. 4,591,617 to crosslink the tire liner compositions with a crosslinking composition containing both (1) a sulfur curative system, which cures through the unsaturation present in the halobutyl rubber or mixtures thereof with butyl rubber, and (2) a nonsulfur curative system, which cures through the halogen functionality of the epihalohydrin rubber in the blend. The sulfur curative system disclosed in U.S. Pat. No. 4,591,617 comprises (a) sulfur, (b) a conventional sulfur accelerator, such as mercaptobenzothiazole and its derivatives, sulfenamides, thiurams, and dithiocarbamate salts, and (c) a zinc oxide promotor. The nonsulfur curative system disclosed in U.S. Pat. No. 4,591,617 comprises di- and tri-functional mercapto compounds and their derivatives, such as 2,5-dimercapto-1,3,4-thiadiazole or trithiocyanuric acid, alone or in combination with a basic activator as set forth in U.S. Pat. Nos. 4,128,510 and 4,288,576.

The basic activator materials that are disclosed in U.S. Pat. Nos. 4,128,510 and 4,288,576 include basic amines and amine salts, and basic metal oxides and hydroxides and their salts with weak acids, such as, for example, lead oxides, zinc oxide, magnesium oxide, calcium oxide, calcium hydroxide, barium oxide, zinc carbonate, barium carbonate, sodium carbonate, lead acetate and sodium acetate. These basic materials are disclosed as being suitable for use in combination with certain 2,5-dimercapto-1,3,4-thiadiazoles as a crosslinking system for halogen-containing polymers, including epihalohydrin homopolymers and copolymers, chlorobutyl rubber and bromobutyl rubber.

Another improved cure system for crosslinking halogen-containing rubbers is disclosed in U.S. Pat. No. 4,357,446 and comprises (1) 2,3-dimercapto-pyrazine or quinoxaline compound as a crosslinking agent, and (2) a compound of a metal of Group II or IV as an acid acceptor. The acid acceptors disclosed in that patent include oxides, hydroxides, carbonates, carboxylates, silicates, borates and phosphites of Group II or IV metals, preferably of Mg, Ba, Ca and Zn; and oxides, basic carbonates, basic carboxylates, basic phosphites, basic sulfites, and tribasic sulfates of Group IVa metals, preferably Sn and Pb. In addition to the crosslinking agent and acid acceptor, the curative system disclosed in U.S. Pat. No. 4,357,446 may include a vulcanization accelerator such as sulfur, a thiuram sulfide, a dithiocarbamate, a sulfenamide, an aliphatic or aromatic amine, or a salt of a weak acid such as 2-mercaptobenzothiazole, phthalic acid or benzoic acid with such an amine. The use of the curative system of the U.S. Pat. No. 4,357,446 for crosslinking a blend of an epichlorohydrin rubber and an epoxy-containing acrylic rubber is described in U.S. Pat. No. 4,511,698.

Still another improved curative system for crosslinking epichlorohydrin rubbers is disclosed in an article by Helfried Ehrend, entitled *Crosslinking Of Epichlorohydrin Elastomers* (Rubber World, pp 29–31, 34–35, May 1985). In that article, it is disclosed that blends of epichlorohydrin homopolymer and epichlorohydrin-ethylene oxide copolymer showed a high degree of vulcanization and very good scorch time using a vulcanizing system comprising Rhenofit UE, barium carbonate and a derivative of mercaptothiadiazole. Rhenofit UE, which is available from Rhein-Chemie Division of Mobay Chemical Corporation, is a derivative of urea. The Chemical Abstracts Registry Number for Rhenofit UE is 96827-93-9 and is disclosed in 103 Chemical Abstracts 55232c.

U.S. Pat. No. 4,624,989 relates to thermoplastic elastomers containing crosslinked epihalohydrin rubbers in combination with a crystalline polyolefin and a chlorinated hydrocarbon. The elastomers are made by simultaneously crosslinking the epihalohydrin rubber and blending the rubber with the other components. The curing system that is used cures the rubber in preference to the crystalline polyolefin and the chlorinated hydrocarbon and comprises a crosslinking agent and one or more accelerators. Among the crosslinking agents disclosed in this patent are substituted thioureas and thiobisureas, di- and trithiols such as the dimercapto-1,3,4-thiadiazoles disclosed in the above-discussed U.S. Pat. No. 4,128,510, trithiocyanuric acid, and the thioester derivatives of the di- and trithiols. Illustrative of accelerators which are disclosed as being useful are elemental sulfur, thiuram sulfides, thiazole and thiazole derivatives, inorganic bases that are hydroxides, oxides or carbonates of metals of Group Ia or IIa of the Mendeleef Periodic Table as disclosed in Moeler, *Inorganic Chemistry*, p. 123 (Wiley & Sons; 1959), basic amines as disclosed in the above-discussed U.S. Pat. No. 4,288,576, and inorganic bases that are metal compounds of Group II and IVb of the Mendeleef Period Table.

U.S. Pat. No. 4,885,341 relates to a rubber composition which gives a vulcanizate having improved resistance to permeation to various gaseous components and improved strength properties. The composition, which is disclosed as being useful for the production of tires, comprises (1) a first vulcanized component, which is vulcanized rubber, vulcanized halogenated butyl rubber or a mixture of both: and (2) a second rubber component which is at least one rubber selected from chlorinated polyethylene rubber, chlorosulfonated polyethylene rubber and epichlorohydrin rubber, wherein the first rubber component is dispersed as crosslinked rubber particles in the second rubber component by dynamic vulcanization or by blending the second rubber component with a powder of the crosslinked first rubber component.

U.S. Pat. No. 4,551,505 relates to the crosslinking of chlorinated polyethylene with 2,5-dimercapto-1,3,4-thiadiazole in the presence of an amido amine corresponding to the formula:

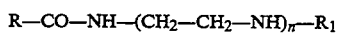

in which R is a saturated or unsaturated hydrocarbon radical containing 6 to 22 carbon atoms; $R_1$ represents alkyl, aryl, cycloalkyl, aralkyl, or $RCOCH_2CH_2$; and n is an integer of from 1 to 10. An example of a suitable amido amine is tetraethylene pentamine distearate.

SUMMARY OF THE INVENTION

Although the cure systems which have been disclosed in the prior art have been used with modest success for crosslinking blends of halobutyl rubbers and epihalohydrin rubbers, it would be advantageous to develop an economical cure system which is uniquely adapted to effect a high degree of crosslinking of such blends at a controllable rate. It also would be advantageous to devise a cure system that would exhibit good scorch safety and that would result in crosslinked rubber blends which do not foul the equipment in which they are processed. Still further advantages would be realized from a cure system that could be used to crosslink a halobutyl rubber/epihalohydrin rubber blend into a product having good tire carcass adhesion and good impermeability to gases, particularly air; and which are useful in liners for pneumatic tires. Good impermeability to gases is also beneficial for tire inner tubes.

These and other advantages are achieved in accordance with the present invention by providing a unique cure system for use in crosslinking or vulcanizing rubber blends comprising, by weight, per 100 parts of rubber, (a) from about 50 to about 98 parts of halobutyl rubber, as hereinafter described in greater detail, or a mixture of halobutyl rubber and other hydrocarbon backbone rubbers, as hereinafter described, wherein the halobutyl rubber is at least 50% by weight of the mixture, and (b) from about 2 to about 50 parts of epihalohydrin rubber. The cure system of this invention consists essentially of, by weight, per 100 parts of the rubber blend, (a) from about 0.1 to about 3 parts sulfur, (b) from about 0.3 to about 4 parts sulfur accelerator, (c) from about 0.2 to about 10 parts zinc-containing promoter, (d) from about 0.05 to about 5 parts urea or urea derivative, and, optionally (e) up to about 5 parts di-or tri-mercapto compound or derivative nonsulfur curative. Also provided in accordance with this invention are crosslinked rubber compositions exhibiting excellent impermeability to gases, especially air, and crosslinked inner liner compositions which exhibit excellent adhesion to pneumatic tire carcasses even at elevated temperatures; i.e., on the order of about 100° C.

DETAILED DESCRIPTION

Figure 1:
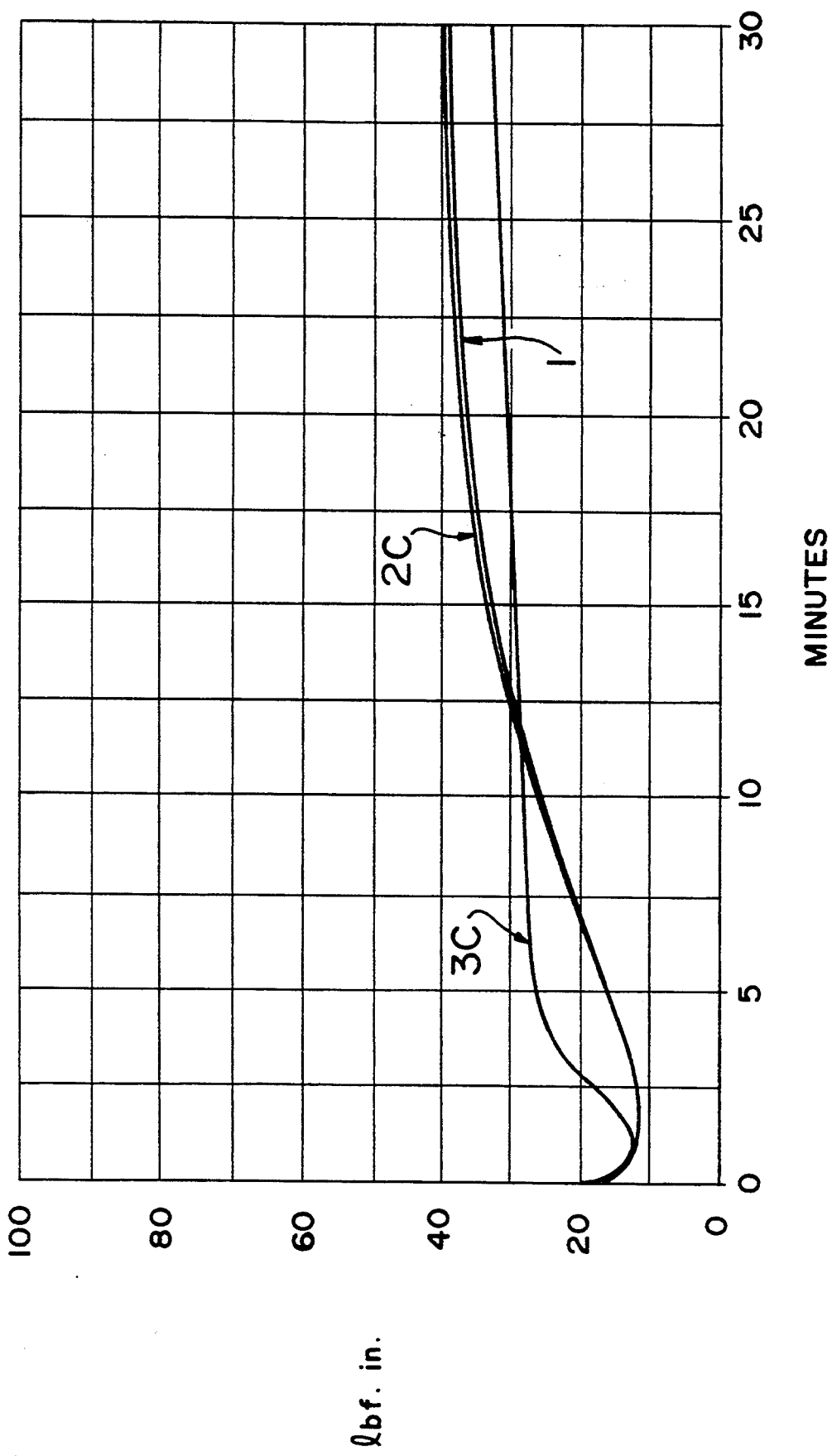
FIG. 1 is an oscillating disc rheometer curve (run at 175° C. at a 3° arc) illustrating torque as a function of cure time for the rubber blends of Examples 1, 2C, and 3C.

The cure system of this invention is used to provide cured or crosslinked rubber blends having excellent impermeability to gases; i.e., resistance to gas or air diffusion, and excellent processing characteristics; i.e., the uncrosslinked blends do not stick to and foul the molds, rolls, presses, etc. in which they are processed. The blends also exhibit an excellent balance of cure rate, degree of crosslinking, scorch safety and physical properties; and are particularly well suited for use in the manufacture of pneumatic tire inner liners and inner tubes.

The cure system is formulated with (a) sulfur (b) sulfur accelerator, (c) a zinc-containing material as a promoter, (d) urea or a urea derivative or mixtures thereof, and, optionally, (e) di- or tri-mercapto compound or derivative such as 2,5-dimercapto-1,3,4-thiadiazole, 2-mercapto-1,3,4-thiadiazole-5-benzoate, trithiocyanuric acid, dithiohydantoins, dimercaptotriazoles, dithioltriazene, and their ester derivatives, alone or together with an appropriate organic base activator as set forth in U.S. Pat. Nos. 4,128,510 and 4,288,576. Mixtures of di- or trimercapto compounds or derivatives, either alone or together with an appropriate organic base activator also may be used. A preferred mercapto compound is 2,4,6-trimercapto-1,3,5-triazine (also known as trithiocyanuric acid). Components (a)–(d) of the cure system cure through the unsaturation present in the halobutyl rubber or mixtures thereof with hydrocarbon backbone rubber, whereas components (d) and (e) cure through the halogen functionality of the materials in the blend.

The cure system comprising only components (a)–(c) is not, in and of itself, novel. Such sulfur cure systems have been known for quite some time and have been disclosed, for example, in U.S. Pat. Nos. 1,912,448; 2,962,474; 2,906,313 and 4,591,617, the disclosures of which are incorporated herein by reference.

The preferred cure systems in accordance with the present invention comprise components (a)–(e), wherein a mercaptobenzothiazole is employed as the sulfur accelerator, i.e. as component (b), and zinc oxide is employed as the promotor, i.e. component (c). Other suitable sulfur accelerators include, for example, derivatives of mercaptobenzothiazole, such as mercaptobenzothiazole disulfide; 2,2'-dithiobis(benzothiazole) and its salts; sulfenamides, such as N,N-diisopropyl-2-benzothiazylsulfenamide and N-cyclohexyl-2-benzothiazylsulfenamide; alkyl dithiocarbamates and dithiocarbamate salts, such as diethyl dithiocarbamate, zinc dithiocarbamate and tellurium dimethyldithiocarbamate; thiurams, such as tetramethylthiuram; and thiuram sulfides, such as dipentamethylenethiuram tetrasulfide. Mixtures of sulfur accelerators also may be used.

Component (d) may comprise urea, a urea derivative such as a urea salt, or mixtures of urea and urea derivatives. Suitable materials which can be used as component (d) include, for example, urea, oil-treated urea such as that sold commercially by Uniroyal Chemicals under the trade designation BIK-OT, urea sulfate, and the commercially available urea-derived vulcanization accelerators known as Rhenofit UE, Rhenofit 1987, Dynamide and Redimix 926. Mixtures of one or more of the above compounds may be used as component (d).

Rhenofit UE, which can be purchased from the RheinChemie Division of Mobay Chemical Corporation, is a whited non-dusting, non-staining and non-toxic powder which has been given the Chemical Abstracts Registry Number 96827-93-9. This compound, which is described as being a urea salt of an organic acid, is known to be useful as a vulcanization accelerator, but its usefulness has been limited heretofore to those cure systems which contain an activator such as magnesium oxide, magnesium sulfate or barium carbonate, in addition to Rhenofit UE and a sulfur accelerator, such as a mercaptothiadiazole derivative (See, Ehrend, *Crosslinking Of Epichlorohydrin Elastomers,* Rubber World, pp. 29–31, 34–35, May 1985). The urea derivatives available under the names Rhenofit 1987 (Rhein-Chemie), Redimix 926 (Harwick Chemicals), Dynamide (Littlern Corporation) and BIK-OT (Uniroyal Chemicals) are known vulcanization accelerators. BIK-OT, for example, has been disclosed in a number of U.S. Patents, e.g. U.S. Pat. Nos. 4,136,084; 4,157,425; 4,655,962; 4,692,475; 4,900,490; and 5,053,438. Urea sulfate has been found to be particularly suitable for use as component (d).

The present cure system is believed to be unique in that it does not require the presence of a Group Ia or IIa metal compound such as magnesium oxide, magnesium sulfate or barium carbonate, and yet provides for an excellent balance of cure rate, degree of crosslinking and scorch safety without adversely affecting the physical properties of the resulting crosslinked rubber blend.

The amounts of the various components of the present cure system which are to be used will depend, at least in part, upon the degree of crosslinking desired, the degree of scorch safety desired, and the rate of cure desired. The determination of such amounts is within the skill of those in the art.

Generally, the cure system will be used in an amount, by weight, per 100 parts of rubber blend, of from about part to about 20 parts, preferably from about 2 parts to about 10 parts. The cure system consists essentially of, per 100 parts of rubber blend, by weight, from about 0.1 parts to about 3 parts sulfur, preferably from about 0.2 to about 2.5 parts, and most preferably from about 0.25 to about 0.75 parts; from about 0.3 parts to about 4 parts sulfur accelerator, preferably from about 0.4 to about 3 parts, and most preferably from about 0.5 to about 2 parts; from about 0.2 parts to about 10 parts zinc-containing promotor, preferably from about 1 to about 5 parts, and most preferably from about 1.5 to about 4 parts; from about 0.05 parts to about 5 parts urea or urea derivative, preferably from about 0.1 parts to about 3.5 parts, and most preferably from about 0.1 to about 1 part; and up to about 5 parts di- or tri-mercapto compound or derivative nonsulfur curative, preferably from about 0.05 parts to about 3 parts, and most preferably from about 0.1 to about 1 part.

The rubber blends can be prepared by blending the rubbers together with all desired ingredients in any desired fashion, e.g. single pass or multiple pass, that allows intimate mixing; for example, in a Banbury mixer or a two roll differential speed mill.

The crosslinking composition of this invention can be incorporated or mixed with the blended ingredients in any desired fashion, such as by simply milling the ingredients and the crosslinking composition on a conventional rubber mill. Preferably the milling is conducted at 50° C. to about 130° C. Other methods of mixing the crosslinking composition with the polymer will be apparent to those skilled in the art.

Crosslinking is effected at elevated temperatures. In general the crosslinking temperature will be from about 100° C. to about 200° C., preferably from about 130° C. to about 190° C., and most preferably from about 140° C. to about 180° C. The time required for crosslinking will vary generally inversely with the temperature and generally will range from about 5 minutes to about 2 hours or more. The crosslinking temperatures and times are within the skill of those versed in the art.

As used in this specification and claims, the term "hydrocarbon backbone rubber" is meant to include rubbers having a predominantly hydrocarbon backbone. Such rubbers include, for example, butyl rubbers; polyisobutylene copolymers and terpolymers, such as poly (isobutylene/α-methystyrene) and poly(isobutylene/paramethylstyrene); natural rubbers; styrene-butadiene rubbers, nitrile rubbers, polychloroprene rubbers; polybutadiene rubbers; EPDM rubbers; and the like.

As is well known in the art, butyl rubber is a copolymer of from about 95.5 to about 99.5 mole % isobutylene and from about 0.5 to about 4.5 mole % isoprene.

As used in this specification and claims, "halobutyl rubber" is meant to include conventional halogenated butyl rubbers, as well as halogenated polyisobutylene copolymers and terpolymers such as poly (isobutylene/α-methyl styrene) or poly(isobutylene/paramethylstyrene). The halogen is present in the rubber as a result of post-treatment of the butyl rubber or polyisobutylene copolymer or terpolymer by reacting chlorine or bromine with the rubber by methods known in the art. Halobutyl rubbers, therefore, are meant to include chlorobutyl, bromobutyl or mixtures of chloro and bromobutyl rubbers, as well as chlorinated polyisobutylene copolymer and terpolymer rubbers, brominated polyisobutylene copolymer and terpolymer rubbers and polyisobutylene copolymer and terpolymer rubbers which are both chlorinated and brominated.

Such materials include chlorobutyl and bromobutyl rubbers prepared by reacting chlorine or bromine with butyl rubber wherein the original unsaturation (usually from about 0.5 to 3.0 mole % isoprene residues) is largely maintained. A suitable commercially available chlorobutyl rubber contains from about 1.1% to about 1.35 % by weight of chlorine and from about 0.5 to 2.0 mole % unsaturation, and has a Mooney viscosity (ML 1+4) at 212° F., using the large rotor, of 40 to 90 Mooney units. A satisfactory bromobutyl rubber prepared from a highly unsaturated butyl rubber contains from 2.1 to 3.0 % by weight of bromine, a density at 25° C. of about 0.96, and evidences a Mooney viscosity at 212° F. of 20 to 90 Mooney Units.

Generally, the halobutyl rubber or the mixture of hydrocarbon backbone rubber and halobutyl rubber is present in the rubber blend in an amount of from about 50 to about 98 parts by weight, per 100 parts of rubber in the blend, preferably from about 65 to about 90 parts. Halobutyl rubber generally is preferred over mixtures of halobutyl and hydrocarbon backbone rubber.

Epihalohydrin rubber includes (1) homopolymers of an epihalohydrin, such as epichlorohydrin, epibromohydrin and others, (2) copolymers of an epihalohydrin with less than 30% of saturated epoxy monomers or with an unsaturated epoxy monomer, and (3) terpolymers of an epihalohydrin with (a) less than 30 % of a saturated epoxy monomer or mixtures thereof, (b) an unsaturated epoxy monomer or mixtures thereof, or (c) mixtures of (a) and (b). The epihalohydrin polymers are prepared by polymerizing a monomeric epihalohydrin alone or together with one or more of the aforementioned epoxy monomers with a suitable catalyst, such as an organometallic catalyst. For example, a reaction product of water with an alkyl aluminum compound is a suitable organometallic catalyst. Such homopolymers are believed to have a repeating structure:

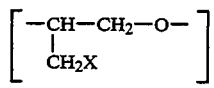

wherein X is a halogen, derived by a polymerization involving the epoxide linkages. Suitable halogens include chlorine and bromine. Typical saturated epoxy monomers include alkylene oxides, such as ethylene oxide, and typical unsaturated epoxy monomers include allylglycidyl ether.

The epihalohydrin polymers are strong, rubbery materials sometimes evidencing more or less crystallinity, having high molecular weight, a density in the range of from about 1.25 to about 1.38, and after 4 minutes at 212F., a Mooney viscosity of from about 40 to about 130 Mooney units. The properties and the preparation of epihalohydrin polymers suitable for use in the practice of this invention are known in the art and are described, for example, in U.S. Pat. No. 3,158,500, the disclosure of which is incorporated herein by reference.

Typically, the epihalohydrin rubber is present in an amount of from about 2 parts to about 50 parts by weight, per 100 parts of the total rubber in the blend, preferably from about 10 to about 35 parts.

In addition to the rubber components and components (a)–(d), and optionally (e) of the cure system, the curable composition of this invention, generally contain auxiliary components commonly used in rubber vulcanization. For example, extenders, fillers, pigments, stabilizers, antioxidants, tackifiers, plasticizers, and softeners may be added. The presence of a filler, particularly carbon black, is beneficial. Generally, the auxiliary components, including the fillers, extenders, etc. are added in an amount of from about 25 parts to about 100 parts by weight per 100 parts of rubber.

The following examples illustrate the invention. All parts and percentages in this specification and claims are by weight unless otherwise indicated. Example numbers followed by a "C" denote comparative examples.

EXAMPLE 1

A master batch of chlorobutyl rubber and epichlorohydrin rubber, together with a conventional sulfur cure system and a nonsulfur cure system was prepared. The composition of the master batch is as follows:

| Composition | Parts by weight |
| --- | --- |
| Chlorobutyl rubber[1]/ | 75 |
| Epichlorohydrin rubber[2]/ | 25 |
| Homogenizing agent[3]/ | 4.0 |
| Stearic acid | 1.0 |
| Alkylphenolic resin tackifier[4]/ | 2.0 |
| Carbon black filler (N 660) | 40 |
| Clay filler | 30 |
| Cure system | |
| (a) elemental sulfur | 0.38 |
| (b) 2-mercaptobenzothiazole | 1.13 |
| (c) zinc oxide | 2.25 |
| (d) urea component[5]/ | 1.0 |

-continued

| Composition | Parts by weight |
|---|---|
| (e) 2,4,6-trimercapto-1,3,5-triazine[6]/ | 0.3 |

[1]/ Chlorobutyl HT-1066 (Exxon Chemicals)
[2]/ Hydrin H-65 (Zeon Chemicals Incorporated)
[3]/ Struktol 40 MS, mixture of aliphatic-naphthenic aromatic hydrocarbon resins (Struktol Corporation)
[4]/ SP-1077 (Schenectady Chemicals Corporation)
[5]/ Rhenofit UE (Rhein-Chemie Division of Mobay Chemical Corporation)
[6]/ Zisnet FPT (Zeon Chemicals)

The composition was prepared by mixing the rubbers and fillers on a Banbury mixer for 5 minutes. The initial temperature of the mixture was approximately 70° C. and the final temperature was about 130° C. The resulting mixture was allowed to cool to room temperature. The components (a)–(e) of the cure system were then added to the rubbers/fillers blend and mixing was conducted for 2 minutes at approximately 85° C. The resulting composition was cured by heating at 160° C. for 30 minutes and the physical properties of the cured composition were tested. The composition and test results are set forth in Tables 1 and 2 and FIG. 1.

EXAMPLE 2C (Comparative)

The procedure of Example 1 was repeated, except that 1.0 parts of barium carbonate were added to the cure system. The composition and test results are set forth in Tables 1 and 2 and FIG. 1.

EXAMPLE 3C (Comparative)

The procedure of Example 1 was repeated, except that the urea component, i.e. component (d), was deleted from the cure system. The composition and test results are set forth in Tables 1 and 2 and FIG. 1.

TABLE 1

| Components | \multicolumn{3}{c}{Examples No., parts by weight} |||
|---|---|---|---|
| | 1 | 2C | 3C |
| Chlorobutyl rubber[1]/ | 75 | 75 | 75 |
| Epichlorohydrin rubber[2]/ | 25 | 25 | 25 |
| Homogenizing agent[3]/ | 4 | 4 | 4 |
| Stearic acid | 1 | 1 | 1 |
| Tackifier resin[4]/ | 2 | 2 | 2 |
| Carbon black (N 660) | 40 | 40 | 40 |
| Clay[5]/ | 30 | 30 | 30 |
| Sulfur | 0.38 | 0.38 | 0.38 |
| 2-mercaptobenzothiazole | 1.13 | 1.13 | 1.13 |
| Zinc oxide | 2.25 | 2.25 | 2.25 |
| 2,4,6-trimercapto-1,3,5-triazine[6]/ | 0.3 | 0.3 | 0.3 |
| Urea component[7]/ | 1.0 | 1.0 | 0 |
| Barium carbonate | 0 | 1.0 | 0 |

[1]/ Chlorobutyl HT-1066 (Exxon Chemical)
[2]/ Hydrin H-65 (Zeon Chemical Incorporated)
[3]/ Struktol 40 MS (mixture of aliphatic; naphthenic; resins (Struktol Corporation)
[4]/ SP-1077 alkyl phenol formaldehyde resin (Schenectady Chemical Corporation)
[5]/ Dixie Clay (R.T. Vanderbilt Corporation)
[6]/ Zisnet FPT (Zeon Chemicals Incorporated)
[7]/ Rhenofit UE (Rhein-Chemie Division of Mobay Chemical Corporation)

TABLE 2

| | Example No. | | |
|---|---|---|---|
| | 1 | 2C | 3C |
| Mooney Scorch, Large Rotor, 135° C. (ASTM-D1646) | | | |
| Minimum viscosity, Mooney units | 51.4 | 52.2 | 51 |
| T5, min. | 15.8 | 14.9 | 9.2 |
| T35, min. | 30+ | 30+ | 15.6 |
| Rheometer, Micro die, 3° arc, 100 cpm, 175° C. (ASTM-D2084) | | | |
| Max. Torque, lbf.in. | 38.3 | 39.5 | 30.7 |
| Min. torque, lbf.in. | 10.8 | 10.9 | 11.8 |
| T2, min. | 2.9 | 2.8 | 1.6 |
| T90, min. | 21.9 | 21.7 | 13.6 |
| Stress/Stain, cured 30 min. at 160° C. (ASTM-D412) | | | |
| 100% Modulus, psi | 282 | 272 | 279 |
| 300% Modulus, psi | 546 | 529 | 518 |
| Tensile, psi | 1378 | 1287 | 1189 |
| % Elongation | 859 | 830 | 838 |
| Hardness, Shore A | 57 | 57 | 60 |
| Graves Die "C" Tear, cured 30 min. at 160° C. (ASTM-D624) | | | |
| Room Temp., lbs./in. | 195 | 200 | 185 |
| Carcass Adhesion[1]/ | | | |
| Room Temp., lbf./in. | 63 | 67 | 112 |
| 212° F., lbf./in. | 23 | 20 | 20 |
| 250° F., lbf./in. | 13 | 13 | 19 |

[1]/ The adhesion between an inner liner compound and a standard carcass coat compound is tested as follows:
A six inch nylon fabric is first coated with a 0.040 inch thick layer of SBR/NR rubber compound and then with a 0.055 inch layer of an inner liner compound. A Mylar tab is then placed along one edge of the coated fabric so that it extends beyond the periphery of fabric. The inner liner compound and the tab are then overcoated with a 0.055 inch thick layer of a standard carcass coat compound comprised of 70 parts natural rubber, 30 parts styrene-butadiene rubber (Ameripol 1502), 50 parts carbon black (N660), 1 part stearic acid, 1 part polymerized 1,2-dihydro-2,2,4 trimethylquinone antioxidant (AgeRite Resin D), 8 parts aromatic oil, 3 parts octylphenol formaldehyde tackifier resin (Dyphene 8318), 3 parts zinc oxide, 2 parts sulfur, and 0.8 parts N-cyclohexyl-2-benzothiazolsulfenamide (Santocure). A second SBR/NR rubber compound coated nylon fabric is then placed over the carcass coat compound such that the natural rubber and carcass coat compound make face-to-face contact. The resulting composite is cured in a plunger type mold for 30 minutes at 160° C. The final thickness of the cured composite is approximately 0.175 inches. Six inch by one inch strips are then cut from the cured composite such that the tab is at the end of the strips. The strips are then pulled apart on an Instron tester at a rate of two inches per minute and the adhesion values are reported in lbs/inch. The test is typically run at room temperature and at 100° C. (212° F.) However, the test can be run at higher temperatures, e.g., 250° F. to determine high temperature adhesion properties.

EXAMPLES 4–7, 8C and 9C

The procedure of Example 1 was followed, except that the amounts of the components of the cure system were varied (Example 4–7). For comparative Example 8C, barium carbonate was added to the cure system; and for comparative Example 9C, the urea component, i.e. component (d), was deleted therefrom. The composition and test results for the master batches for Examples 4–7 and 8C–9C are set forth in Tables 3 and 4 and FIGS. 2 and 3.

TABLE 3

| Components | \multicolumn{6}{c}{Example No., parts by weight} ||||||
|---|---|---|---|---|---|---|
| | 4 | 5 | 6 | 7 | 8C | 9C |
| Chlorobutyl TH-1066 | 75 | 75 | 75 | 75 | 75 | 75 |
| Hydrin H-65 | 25 | 25 | 25 | 25 | 25 | 25 |
| N660 | 40 | 40 | 40 | 40 | 40 | 40 |
| Dixie Clay | 30 | 30 | 30 | 30 | 30 | 30 |
| Stearic Acid | 1 | 1 | 1 | 1 | 1 | 1 |
| SP-1077 | 2 | 2 | 2 | 2 | 2 | 2 |
| Struktol 40 MS | 4 | 4 | 4 | 4 | 4 | 4 |
| Zinc Oxide | 2.25 | 2.25 | 2.25 | 2.25 | 2.25 | 2.25 |
| MBTS | 1.13 | 1.13 | 1.13 | 1.13 | 1.13 | 1.13 |
| Sulfur | 0.38 | 0.38 | 0.38 | 0.38 | 0.38 | 0.38 |
| Zisnet FPT | 0.3 | 0.3 | 0.3 | 0.3 | 0.3 | 0.3 |
| Rhenofit UE | 1 | 0.75 | 0.5 | 0.25 | 1 | 0 |
| Barium Carbonate | 0 | 0 | 0 | 0 | 1 | 0 |

TABLE 4

| | Example No. | | | | | |
|---|---|---|---|---|---|---|
| | 4 | 5 | 6 | 7 | 8C | 9C |
| Mooney Scorch, | | | | | | |

TABLE 4-continued

|  | Example No. | | | | | |
|---|---|---|---|---|---|---|
|  | 4 | 5 | 6 | 7 | 8C | 9C |
| Large Rotor, 135° C. | | | | | | |
| Minimum Viscosity, Mooney Units | 48.9 | 48.5 | 46.9 | 47.0 | 47.6 | 46.7 |
| $T_5$, minutes | 10.0 | 10.0 | 10.6 | 8.5 | 9.5 | 8.5 |
| $T_{35}$, minutes | 19.6 | 20.8 | 19.5 | 13.3 | 18.7 | 13.1 |
| Rheometer, Micro Die, 3° arc, 100 cpm, 175° C. | | | | | | |
| Max Torque, lbf.in. | 36.7 | 38.7 | 35.4 | 32.6 | 37.0 | 32.2 |
| Min Torque, lbf.in. | 10.6 | 10.7 | 10.9 | 11.2 | 10.5 | 11.3 |
| $T_2$, minutes | 3.8 | 3.5 | 3.3 | 2.8 | 3.5 | 2.4 |
| $T_{90}$, minutes | 22.0 | 19.5 | 14.8 | 15.5 | 21.6 | 15.5 |

TABLE 5

| Components | Example No., parts by weight | |
|---|---|---|
|  | 10 | 11C |
| Chlorobutyl HT-1066 | 75 | 75 |
| Hydrin H-65 | 25 | 25 |
| N660 | 40 | 40 |
| Dixie Clay | 30 | 30 |
| Stearic Acid | 1 | 1 |
| SP-1077 | 2 | 2 |
| Struktol 40 MS | 4 | 4 |
| ZnO | 2.25 | 2.25 |
| MBTS | 1.13 | 1.13 |
| Spider Sulfur | 0.38 | 0.38 |
| Zisnet FPT | 0.3 | 0.3 |
| Rhenofit UE | 1 | 1 |
| $BaCO_3$ | 0 | 1 |

TABLE 6

|  | Example No. | |
|---|---|---|
|  | 10 | 11C |
| Stress Strain, cured 30 min. at 160° C. | | |
| 100% Modulus, psi | 238 | 245 |
| 300% Modulus, psi | 515 | 524 |
| Tensile, psi | 1372 | 1369 |
| % Elongation | 843 | 825 |
| Hardness, Shore A | 63 | 63 |
| Stress Strain, cured 30 min. 160° deg. C., aged 70 hrs. @ 100 C. | | |
| 100% Modulus, psi | 471 | 456 |
| 300% Modulus, psi | 844 | 838 |
| Tensile, psi | 1386 | 1352 |
| % Elongation | 635 | 637 |
| Hardness, Shore A | 70 | 70 |
| Air Permeability, 35° C., 48 psi ml × mil/(100 in² × day × atm.) | 66.4 | 69.9 |
|  | 64.4 | 66.5 |
|  | 64.3 | 77.1 |
|  | 64.9 | 56.7 |
| Adhesion To Carcass Coat, Cured 30 min., at 160° C. | | |
| Room Temp, lbf./in. | 62 | 57 |
| 212 F., lbf./in. | 16 | 14 |
| 250 F., lbf./in. | 16 | 14 |
| Green Strength, Room Temp. Peak Stress, psi | 112 | 106 |
| Monsanto Tel Tack, 16 PSI load, 1 min. dwell | | |
| Original psi | 10 | 11 |
| 96 hr aging, psi | 6 | 11 |
| Demattia Flex, Cut Growth, 0.1 in. Initial Cut, Cured 30 @ 160° C., | | |
| 100 K cycles, in. | 0.3 | 0.3 |
| 200 K cycles, in. | 0.4 | 0.4 |
| 300 K cycles, in. | 0.4 | 0.4 |
| 500 K cycles, in. | 0.5 | 0.5 |
| 700 K cycles, in. | 0.5 | 0.6 |
| 1000 K cycles, in. | 0.8 | 0.8 |
| Demattia Flex, Cut Growth, 0.1 in. Initial Cut, Cured 30 @ 160° C., Aged 70 hrs @ 100 C. | | |
| 100 K cycles, in. | 0.5 | 0.6 |
| 200 K cycles, in. | 0.6 | 0.8 |
| 300 K cycles, in. | 0.8 | 0.9 |
| 500 K cycles, in. | 0.9 | 1 |
| 700 K cycles, in. | 0.9 | |
| 1000 K cycles, in. | 0.9 | |
| Moisture Vapor Transmission Rate 24 hr loss, mg/m² | 0.01 | 0.003 |

EXAMPLES 12 AND 13C–18C

The procedure of Example 1 was followed (Example except that barium carbonate was added to the cure system (Example 13C), the trimercapto triazine compound, i.e. component (e), was deleted from the cure system (Examples 14, 15 and 16C–18C), or both the urea salt (Rhenofit UE), i.e. component (d) and trimercapto compound, i.e. component (e), were deleted (Examples 16C and 17C). In two of the examples (Examples 17C and 18C), the blend of chlorobutyl rubber and epichlorohydrin rubber was replaced with 100% chlorobutyl rubber. The composition and test results are set forth in Tables 7 and 8 and FIGS. 4–6.

TABLE 7

| Ingredients | Example No., parts by weight | | | | | | |
|---|---|---|---|---|---|---|---|
|  | 12 | 13C | 14 | 15 | 16C | 17C | 18C |
| Chlorobutyl HT-1066 | 75 | 75 | 75 | 75 | 75 | 100 | 100 |
| Hydrin H-65 | 25 | 25 | 25 | 25 | 25 | — | — |
| N660 | 40 | 40 | 40 | 40 | 40 | 40 | 40 |
| Dixie Clay | 30 | 30 | 30 | 30 | 30 | 30 | 30 |
| Stearic Acid | 1 | 1 | 1 | 1 | 1 | 1 | 1 |
| SP-1077 | 2 | 2 | 2 | 2 | 2 | 2 | 2 |
| Struktol 40 MS | 4 | 4 | 4 | 4 | 4 | 4 | 4 |
| ZnO | 2.25 | 2.25 | 2.25 | 3 | 3 | 3 | 3 |
| MBTS | 1.13 | 1.13 | 1.13 | 1.5 | 1.5 | 1.5 | 1.5 |
| Spider Sulfur | 0.38 | 0.38 | 0.38 | 0.5 | 0.5 | 0.5 | 0.5 |
| Zisnet FPT | 0.3 | 0.3 | — | — | — | — | — |
| Rhenofit UE | 1 | 1 | 1 | 1 | — | — | 1 |
| $BaCO_3$ | — | 1 | — | — | — | — | — |

TABLE 8

|  | 12 | 13C | 14 | 15 | 16C | 17C | 18C |
|---|---|---|---|---|---|---|---|
| Mooney Scorch, Large Rotor, 135° C. | | | | | | | |
| Minimum Viscosity | 49.7 | 46.2 | 46.6 | 46.1 | 43.6 | 41.6 | 48 |
| $T_5$, minutes | 9 | 10.5 | 10.7 | 10.3 | 8.7 | 7.7 | 14.7 |
| $T_{35}$, minutes | 19.9 | 19.8 | 27.2 | 26.8 | 14 | 15.7 | — |
| Rheometer, Micro Die, 3° arc, 100 cpm, 175° C. | | | | | | | |
| Max Torque lbf.in. | 41.6 | 41.5 | 37.4 | 39 | 32.9 | 32.9 | 38 |
| Min Torque lbf.in. | 13.6 | 14 | 13.2 | 13.1 | 13.5 | 12.5 | 12.3 |
| $T_2$, minutes | 3 | 3 | 3.3 | 3.3 | 2.3 | 1.8 | 4 |
| $T_{90}$, minutes | 22 | 22 | 23 | 24 | 20 | 20 | 25 |
| Stress Strain, | | | | | | | |

TABLE 8-continued

|  | 12 | 13C | 14 | 15 | 16C | 17C | 18C |
|---|---|---|---|---|---|---|---|
| cured 30 min. at 160° C. | | | | | | | |
| 100% Modulus, psi | 268 | 261 | 252 | 253 | 251 | 258 | 219 |
| 300% Modulus, psi | 540 | 527 | 484 | 485 | 472 | 667 | 583 |
| Tensile, psi | 1307 | 1361 | 1304 | 1270 | 1144 | 1431 | 1533 |
| % Elongation | 811 | 841 | 865 | 866 | 825 | 751 | 786 |
| Hardness, Shore A | 57 | 55 | 56 | 57 | 57 | 55 | 50 |

EXAMPLES 19C–26C

Figure 7:
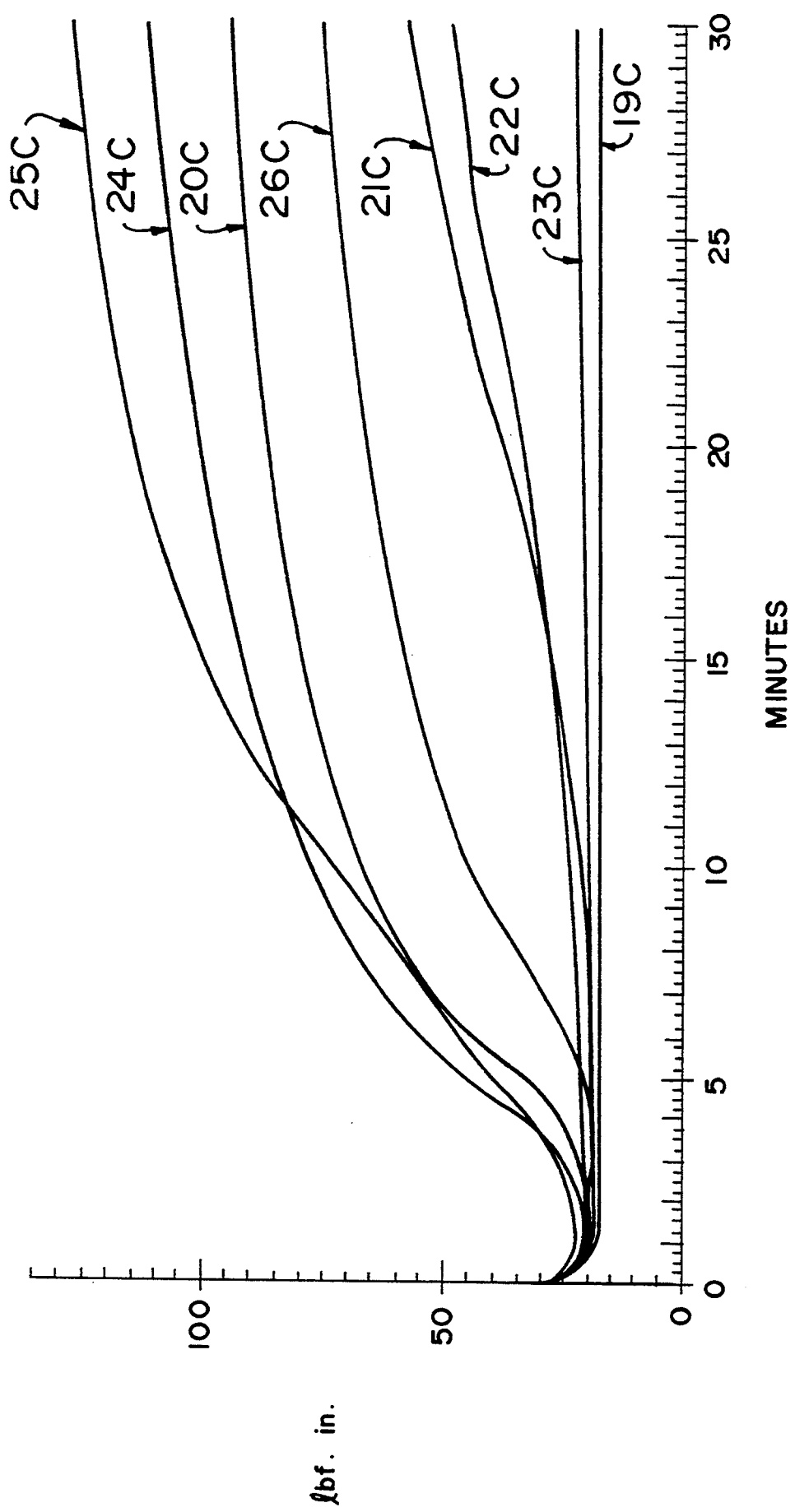
FIG. 7 is an oscillating disc rheometer curve (run at 175° C. at a 3° arc) comparing the torque vs. cure time of the rubber compositions of Examples 19C–26C.

Master batches of epichlorohydrin rubber, together with various cure systems were prepared. The various master batches were crosslinked by heating at 160° C. for 30 minutes and the rate and degree of crosslinking were monitored. The composition of the various master batches and test results are set forth in Tables 9 and 10 and the test data is illustrated in FIG. 7.

TABLE 9

| | Example No., parts by weight | | | | | | | |
|---|---|---|---|---|---|---|---|---|
| Ingredients | 19C | 20C | 21C | 22C | 23C | 24C | 25C | 26C |
| Hydrin H | 100 | 100 | 100 | 100 | 100 | 100 | 100 | 100 |
| N660 | 45 | 45 | 45 | 45 | 45 | 45 | 45 | 45 |
| G(NBC) D70[1]/ | 1.4 | 1.4 | 1.4 | 1.4 | 1.4 | 1.4 | 1.4 | 1.4 |
| Stearic acid | 2 | 2 | 2 | 2 | 2 | 2 | 2 | 2 |
| Zisnet FPT | 1.2 | 1.2 | 1.2 | 1.2 | 1.2 | 1.2 | 1.2 | 1.2 |
| Rhenofit UE | — | 4 | — | — | — | 4 | 4 | 4 |
| BaCO$_3$ | — | — | 4 | — | — | 4 | — | — |
| MgO | — | — | — | 4 | — | — | 4 | — |
| ZnO | — | — | — | — | 4 | — | — | 4 |

[1]/ 70% nickel dibutyldithiobarbamate on 30% ethylene propylene rubber binder (Rhein-Chemie Division of Mobay Chemical)

TABLE 10

| | 19C | 20C | 21C | 22C |
|---|---|---|---|---|
| Rheometer, Micro Die, 3° arc, 100 cpm, 175° C. | | | | |
| Max Torque, lbf.in. | 17.4 | 94.1 | 58.8 | 48 |
| Min Torque, lbf.in. | 16.5 | 19.1 | 18 | 20 |
| T$_2$, minutes | | 2.4 | 5 | 3.2 |
| T$_{90}$, minutes | | 18.7 | 27.7 | 26.2 |
| Stress Strain, cured 30 min. at 160° C. | | | | |
| 100% Modulus, psi | * | 729 | 357 | 274 |
| 300% Modulus, psi | | 937 | 727 | |
| Tensile, psi | | 1481 | 1409 | 1271 |
| % Elongation | | 234 | 769 | 889 |
| Hardness, Shore A | | 70 | 61 | 61 |

| | 23C | 24C | 25C | 26C |
|---|---|---|---|---|
| Rheometer, Micro Die, 3° arc, 100 cpm, 175° C. | | | | |
| Max Torque, lbf.in. | 18.8 | 111.4 | 126.8 | 75.1 |
| Min Torque, lbf.in. | 21.4 | 20.1 | 21.9 | 16.7 |
| T$_2$, minutes | | 2 | 2 | 3.9 |
| T$_{90}$, minutes | | 19.9 | 20.3 | 22 |
| Stress Strain, cured 30 min. at 160° C. | | | | |
| 100% Modulus, psi | * | 1201 | 1122 | 888 |
| 300% Modulus, psi | | | | |
| Tensile, psi | | 1587 | 1628 | 1602 |
| % Elongation | | 140 | 159 | 249 |
| Hardness, Shore A | | 77 | 75 | 73 |

* = did not cure

The data in Table 2 indicates that the Mooney scorch viscosity for the chlorobutyl/epichlorohydrin rubber blend, which was crosslinked in accordance with the present invention (Example 1), compared favorably with that of the more expensive blend which contained barium carbonate in the cure system in addition to the required components (a)–(d) and the optional component (e), i.e. the 2,4,6-trimercapto-1,3,5,-triazine (Example 2C); and that the Mooney scorch for the rubber blend of Example 1 was superior to that of the rubber blend which was cured with a system containing components (a)–(c) and (e), but lacking the urea or urea derivative component (d) (Example 3C). In each of the tests reported in Table 2, the rubber blend of Example 1 compared favorably with the rubber blend cured with the more expensive cure system used in Example 2C. In this latter regard, and with reference to FIG. 1, it can be seen that the rheometer test data, plotted as torque (pounds force×inches) versus time (minutes) at 175° C. indicates that the rubber blends of Example 1 and Example 2C cured at substantially the same rate and to substantially the same degree of crosslinking; whereas the rubber blend of Example 3C cured more rapidly during the first five minutes and then leveled off such that the degree of crosslinking after 30 minutes was significantly lower than for either of the rubber blends of Examples 1 or 2C.

Figure 2:
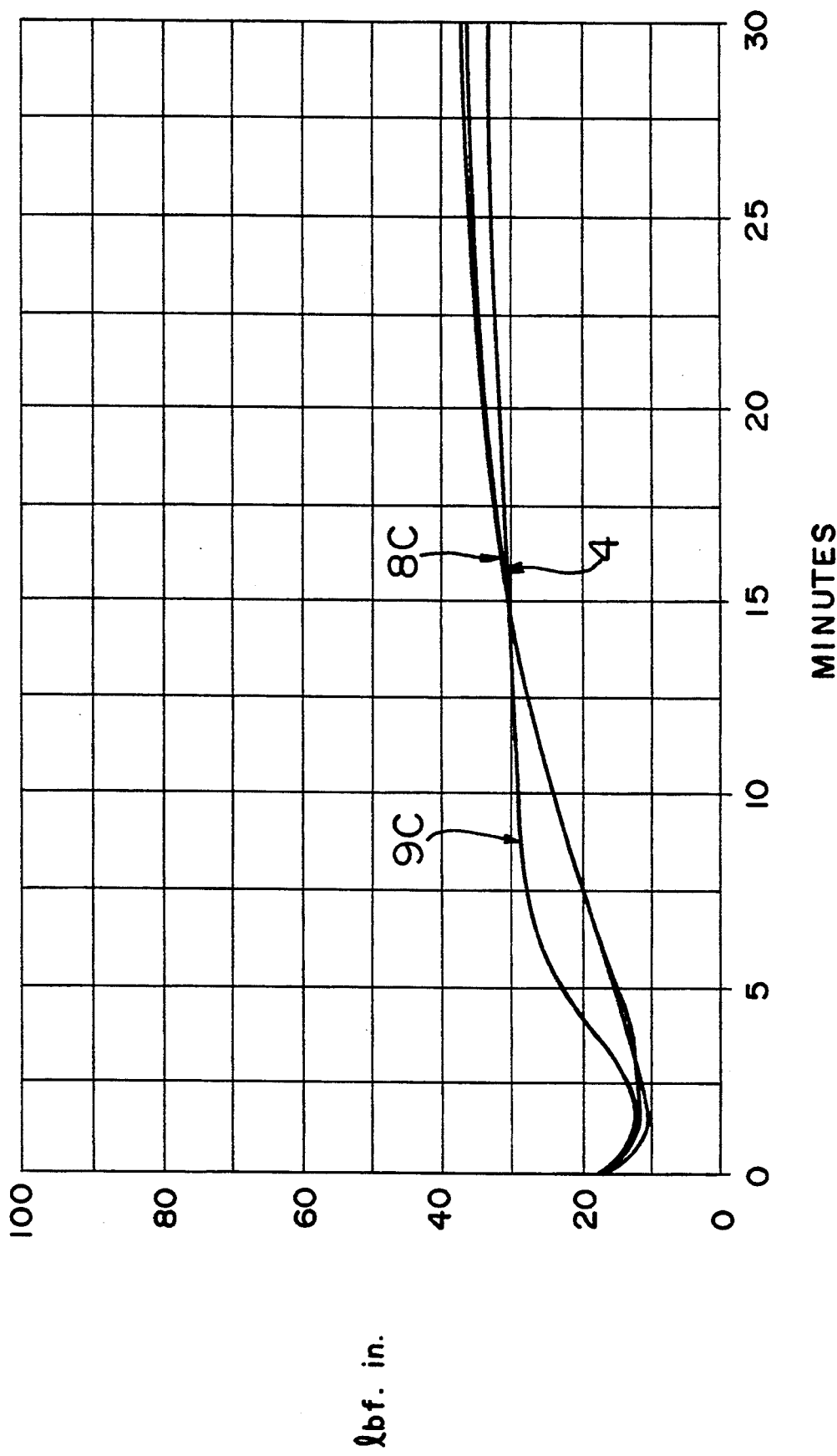
FIG. 2 is an oscillating disc rheometer curve (run at 175° C. at a 3° arc) illustrating torque as a function of cure time for the rubber blends of Examples 4, 8C and 9C.
Figure 3:
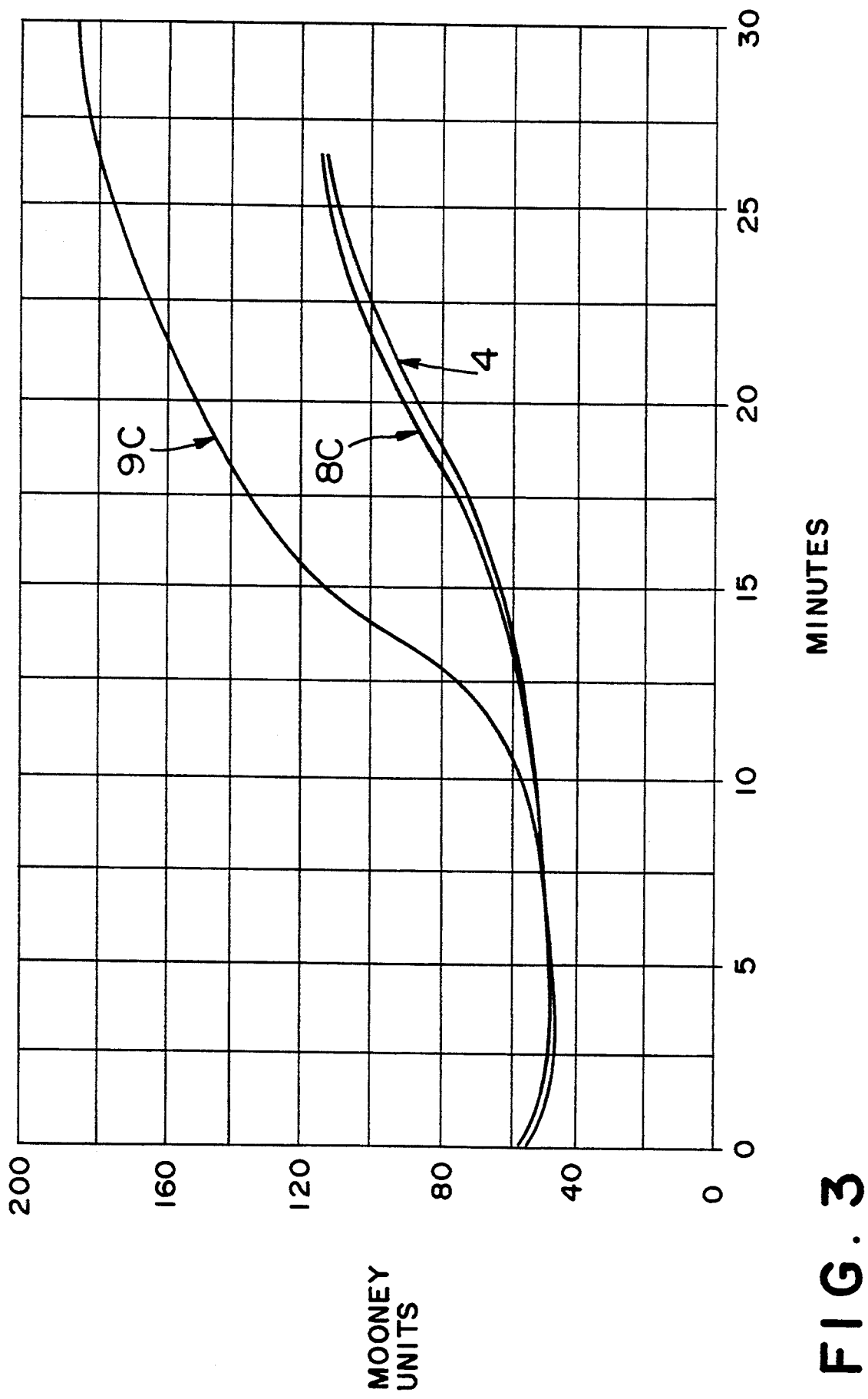
FIG. 3 is a graph illustrating the Mooney scorch results (at 135° C.) for the rubber blends of Examples 4, 8C and 9C.

The test results set forth in Table 4 confirm the results set forth in Table 2. For example, the results clearly indicate that a rubber blend cured with the cure system of the present invention (Example 4) exhibited essentially the same rheometer curve as a rubber blend cured with a system which contained barium carbonate (Example 8C) but which was in all other respects identical to the dual cure system of this invention. The data also indicate that even with as little as 0.25 parts of urea component per 100 parts of rubber in the blend being cured (Example 8C), the blends that were cured in accordance with the present invention compared favorably with the blend cured with the more expensive barium carbonate-containing cure system (Example 8C). The similar physical properties exhibited by the blends that were crosslinked in accordance with the present invention and the blend crosslinked using the barium carbonate-containing system can be seen by comparing the almost identical rheometer and Mooney scorch curves for the blends of Examples 4 and 8C (FIGS. 2 and 3, respectively). FIG. 3 also illustrates that for about the first 9 minutes into the test, the Mooney torque of the blend cured in the absence of both barium carbonate and the urea component (Example 9C) was substantially the same as that for the blend which was cured in the presence of barium carbonate (Example 8C) and the blend cured in accordance with the present invention (Example 4); but that after about 9 minutes, the torque (for the blend of Example 9C) increased much more rapidly. Accordingly, the data suggests that the urea component, in addition to accelerating the crosslinking of the epichlorohydrin portion of the rubber blend, has some effect in moderating the crosslinking of the chlorobutyl rubber portion of the blend.

The data in Table 6 indicate that the blend prepared in accordance with the present invention (Example 10), compared favorably in terms of its stress-strain test results with the blend cured in the presence of the more expensive barium carbonate-containing cure system (Example 11C). The data in Table 6 also indicate that the cured blends of Examples 10 and 11C exhibited comparable air permeability, carcass adhesion, green strength, tel tack, moisture vapor transmission rates, and Demattia flex properties.

Figure 4:
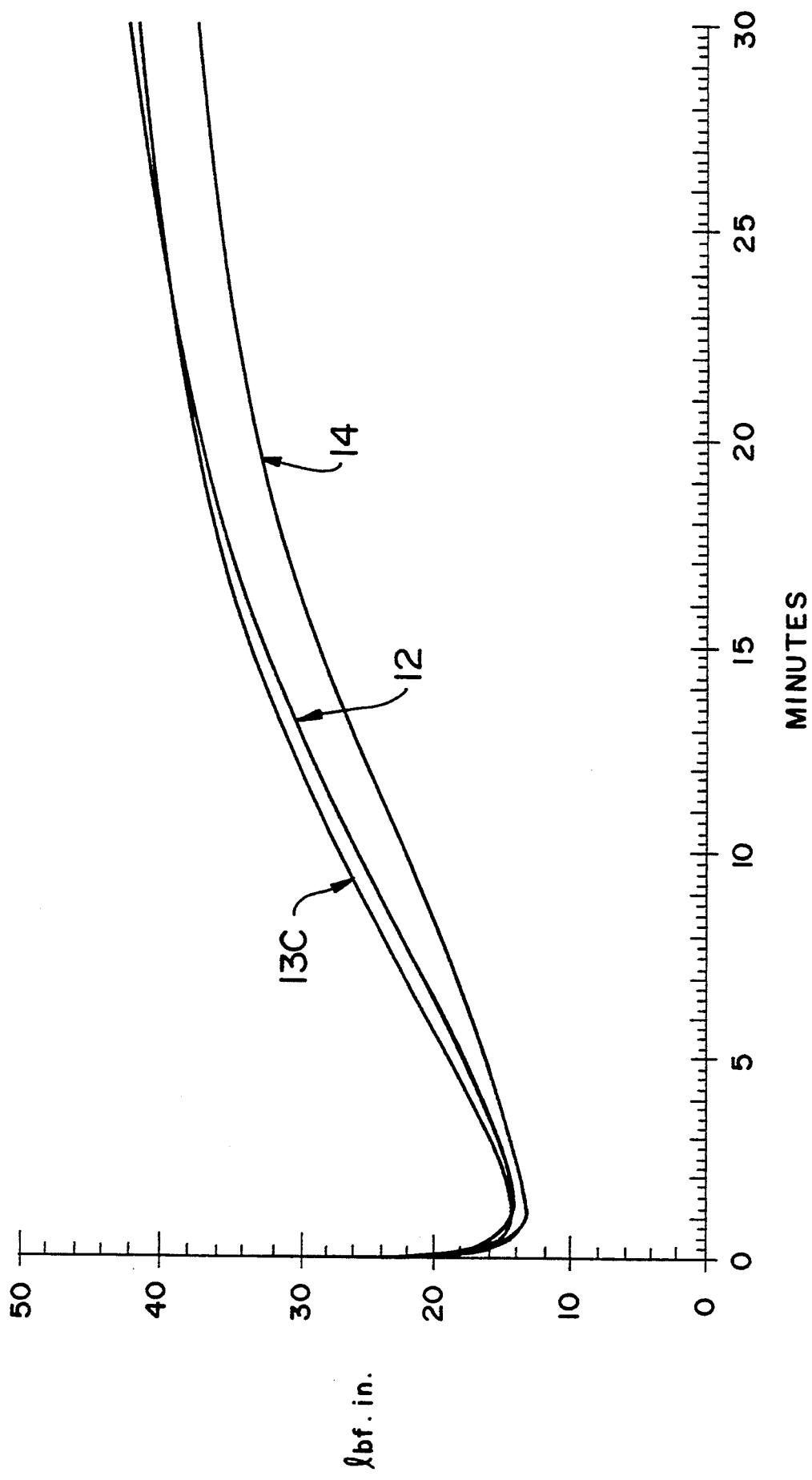
FIG. 4 is an oscillating disc rheometer curve (run at 175° C. at a 3° arc) comparing the torque vs. cure time cure for the rubber blends of Examples 12, 13C and 14.

The data in Tables 7 and 8 confirmed that the physical properties of the chlorobutyl/epichlorohydrin rubber blend cured in the presence of a cure system comprising components (a)–(e) (Example 12) compared favorably with an identical blend cured with a barium carbonate-containing cure system (Example 13C). The data also confirmed that the physical properties of the chlorobutyl/epichlorohydrin rubber blend cured in the presence of a cure system which does not contain any of the optional trimercapto triazine component (e) (Examples 14 and 15) compared favorably with the cured blend of Examples 12 and 13C. The rheometer test data for the blends of Examples 12, 13C and 14, which is illustrated graphically in FIG. 4, shows that the blends of Examples 12 and 13C cured at substantially the same rate and to substantially the same degree, whereas the blend of Example 14 cured at a slightly slower rate and to a slightly lesser degree. The data also illustrates the inferior physical characteristics exhibited by a cured rubber blend which is identical to that of Example 12, except that it was cured in the absence of the urea salt; i.e. component (d) and trimercapto triazine compound, i.e., component (e) of the cure system (Example 16C).

Figure 5:
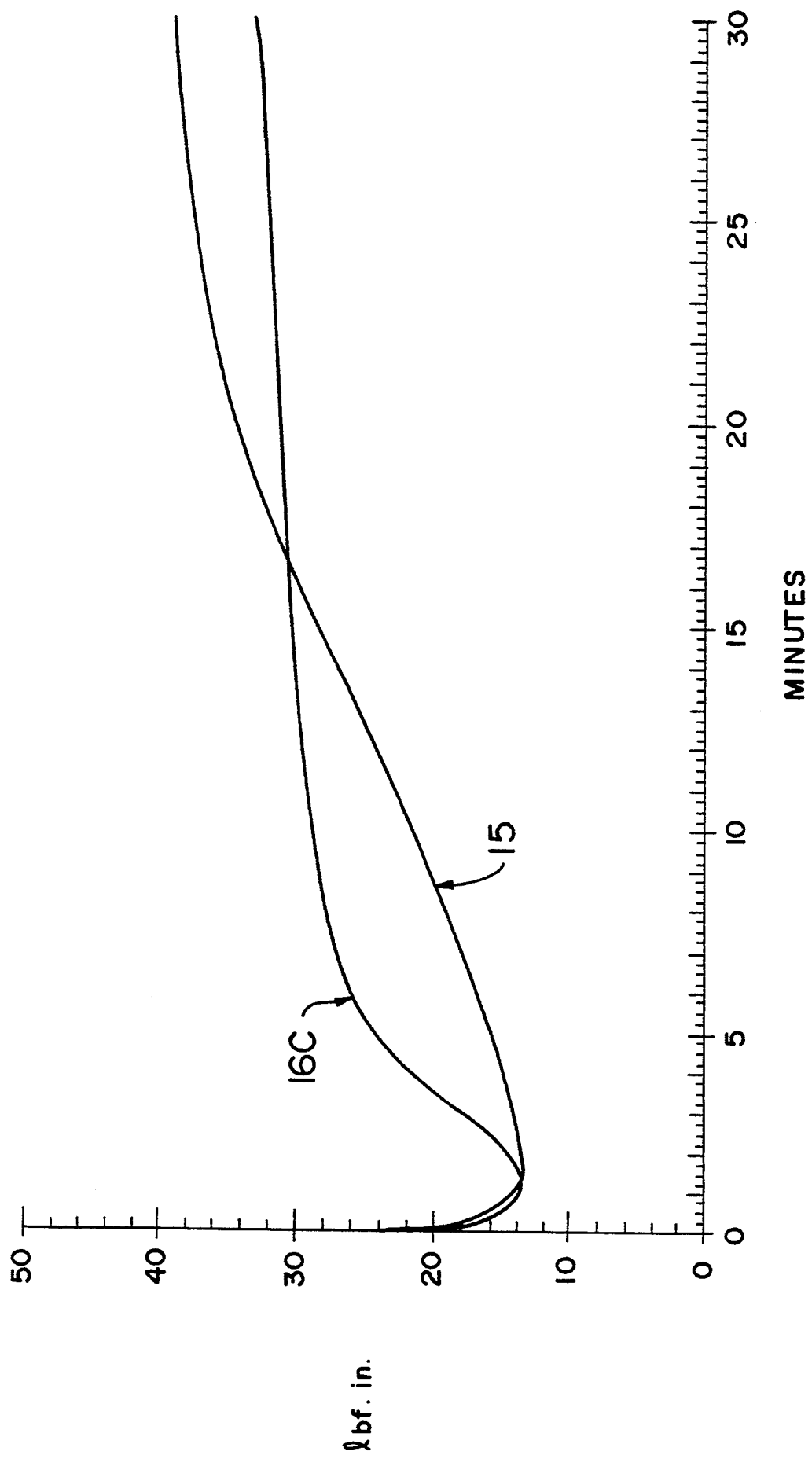
FIG. 5 is an oscillating disc rheometer curve (run at 175° C. at a 3° arc) comparing torque vs. cure time for the rubber compositions of Examples 15 and 16C.
Figure 6:
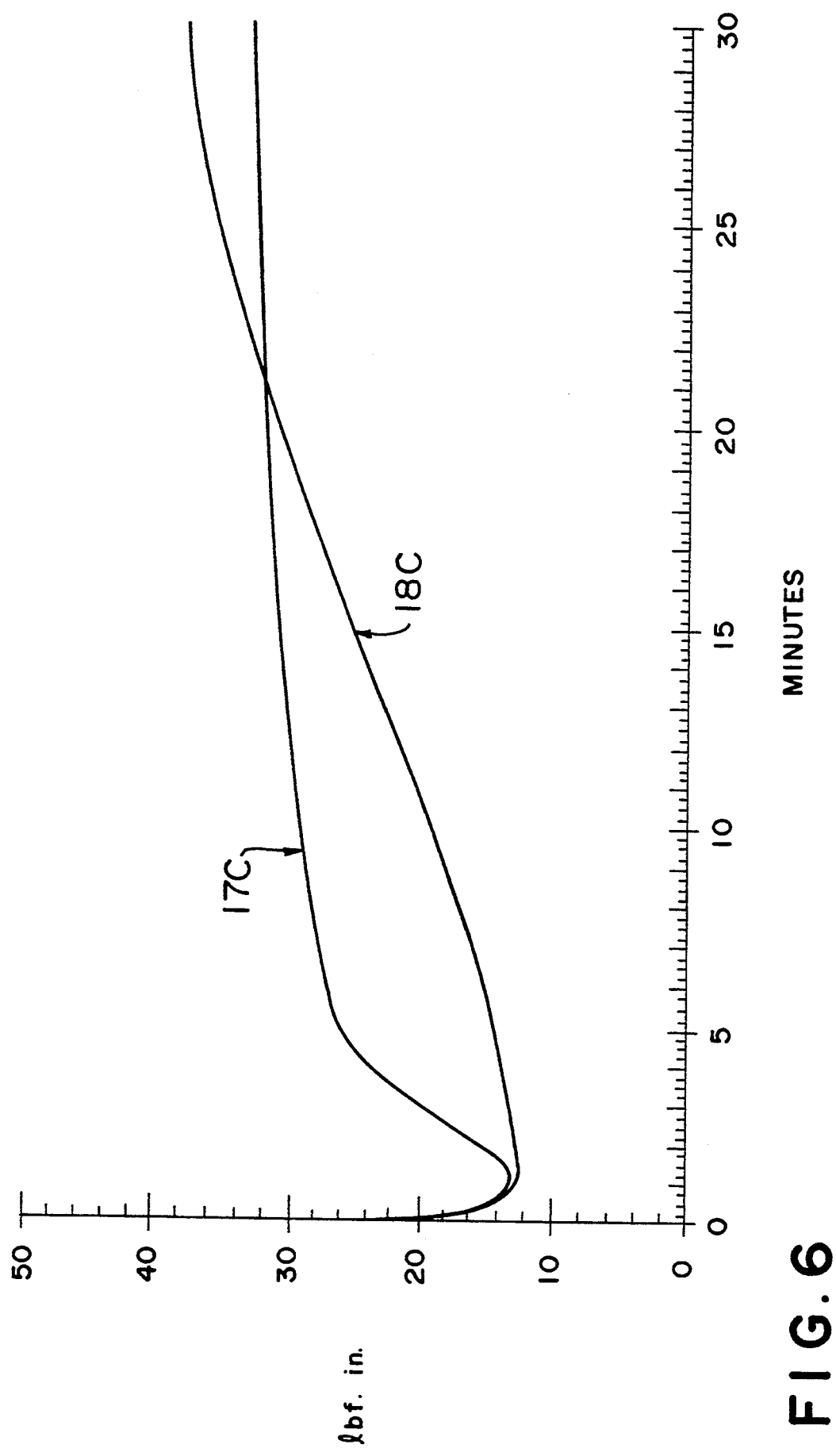
FIG. 6 is an oscillating disc rheometer curve (run at 175° C. at a 3° arc) comparing torque vs. cure time for the rubber compositions of Examples 17C and 18C.

The data in Tables 7 and 8 also indicate that the urea component has a moderating effect on the cure system (Examples 15, 16C, 17C and 18C); this moderating effect being illustrated graphically by the rheometer curves shown in FIGS. 5 and 6. Clearly, the blends which include the urea component in the cure system (Examples 15 and 18C) cure at a slower initial rate, but to a higher degree of crosslinking than do the blends which do not contain any urea component in the cure system (Examples 16C and 17C). This is true regardless of whether the rubber being cured comprises a blend of halobutyl rubber and epichlorohydrin rubber (Examples 15 and 16C) or solely halobutyl rubber (Examples 17C and 18C).

Tables 9 and 10 and FIG. 7 illustrate the effects on the cure rate and degree of crosslinking of various cure systems on an epichlorohydrin rubber formulation (Examples 19C–26C). The rheometer data shows that there is no measurable increase in torque, i.e., no crosslinking, when the rubber is heated at 175° C. for 30 minutes in the presence of only the trimercapto triazine compound (Example 19C) or the trimercapto triazine compound in combination with zinc oxide (Example 23C), and that rate of cure and degree of crosslinking increases only slightly, with the additional presence of magnesium oxide (Example 22C), or barium carbonate (Example 21C) in the cure system. FIG. 7 also illustrates that the presence of both the urea component and the trimercapto triazine compound in the cure system (Example 20C) results in a rapid increase in cure rate after about 5 minutes, with a corresponding gradual increase in the torque over the remainder of the test. FIG. 7 also illustrates that the very rapid cure rates and high degrees of crosslinking are only slightly improved by the addition of barium carbonate (Example 24C) or magnesium oxide (Example 25C) to the compound containing the trimercapto triazine compound and urea component. The addition of zinc oxide (Example 26C) decreases the cure rate and degree of crosslinking when the urea derivative is present.

EXAMPLES 27C and 28–39

The procedure of Example 1 was followed, except that the Rhenofit UE, i.e. the urea component (d) of the cure system, was deleted (Example 27C) or was replaced with an equal amount of another urea component (Examples 28–42). The various compositions and test results are set forth in Tables 11, 12, 13 and 14 and FIGS. 8, 9 and 10.

TABLE 11

| Components | Example No., parts by weight | | | | |
|---|---|---|---|---|---|
| | 27C | 28 | 29 | 30 | 31 |
| Chlorobutyl rubber | 75 | 75 | 75 | 75 | 75 |
| Epichlorohydrin rubber | 25 | 25 | 25 | 25 | 25 |
| Homogenizing agent | 4 | 4 | 4 | 4 | 4 |
| Stearic acid | 1 | 1 | 1 | 1 | 1 |
| Tackifier resin | 2 | 2 | 2 | 2 | 2 |
| Carbon block | 40 | 40 | 40 | 40 | 40 |
| Clay | 30 | 30 | 30 | 30 | 30 |
| Sulfur | 0.38 | 0.38 | 0.38 | 0.38 | 0.38 |
| 2-mercapto-benzothiazole | 1.13 | 1.13 | 1.13 | 1.13 | 1.13 |
| Zinc oxide | 2.25 | 2.25 | 2.25 | 2.25 | 2.25 |
| Urea component[1]/ | — | 1 | 1 | 1 | 1 |
| 2,4,6-trimercapto-1,3,5-triazine | 0.3 | 0.3 | 0.3 | 0.3 | 0.3 |

TABLE 12

| Components | Example No., parts by weight | | | | |
|---|---|---|---|---|---|
| | 27C | 32 | 33 | 34 | 35 |
| Chlorobutyl rubber | 75 | 75 | 75 | 75 | 75 |
| Epichlorohydrin rubber | 25 | 25 | 25 | 25 | 25 |
| Homogenizing agent | 4 | 4 | 4 | 4 | 4 |
| Stearic acid | 1 | 1 | 1 | 1 | 1 |
| Tackifier resin | 2 | 2 | 2 | 2 | 2 |
| Carbon block | 40 | 40 | 40 | 40 | 40 |
| Clay | 30 | 30 | 30 | 30 | 30 |
| Sulfur | 0.38 | 0.38 | 0.38 | 0.38 | 0.38 |
| 2-mercapto-benzothiazole | 1.13 | 1.13 | 1.13 | 1.13 | 1.13 |
| Zinc oxide | 2.25 | 2.25 | 2.25 | 2.25 | 2.25 |
| Urea component[1]/ | — | 1 | 1 | 1 | |
| 12,4,6-trimercapto-1,3,5-triazine | 0.3 | 0.3 | 0.3 | 0.3 | 0.3 |

TABLE 13

| Components | Example No., parts by weight | | | | | | |
|---|---|---|---|---|---|---|---|
| | 36C | 37 | 38 | 39 | 40 | 41 | 42 |
| Chlorobutyl rubber | 75 | 75 | 75 | 75 | 75 | 75 | 75 |
| Epichlorohydrin rubber | 25 | 25 | 25 | 25 | 25 | 25 | 25 |
| Homogenizing agent | 4 | 4 | 4 | 4 | 4 | 4 | 4 |
| Stearic acid | 1 | 1 | 1 | 1 | 1 | 1 | 1 |
| Tackifier resin | 2 | 2 | 2 | 2 | 2 | 2 | 2 |
| Carbon block | 40 | 40 | 40 | 40 | 40 | 40 | 40 |
| Clay | 30 | 30 | 30 | 30 | 30 | 30 | 30 |
| Sulfur | 0.38 | 0.38 | 0.38 | 0.38 | 0.38 | 0.38 | 0.38 |
| 2-mercapto-benzothiazole | 1.13 | 1.13 | 1.13 | 1.13 | 1.13 | 1.13 | 1.13 |
| Zinc oxide | 2.25 | 2.25 | 2.25 | 2.25 | 2.25 | 2.25 | 2.25 |
| Urea component[1]/ | — | 1 | 1 | 1 | 1 | 1 | 1 |
| 2,4,6-trimercapto-1,3,5-triazine | 0.3 | 0.3 | 0.3 | 0.3 | 0.3 | 0.3 | 0.3 |

TABLE 13-continued

1/ the urea component is as follows:

| Example | Urea Component |
|---|---|
| 27C | none |
| 28 | Redimix 926 |
| 29 | Rhenofit UE |
| 30 | BIK-OT |
| 31 | Dynamide |
| 27C | none |
| 32 | Urea |
| 33 | Urea phosphate |
| 34 | Urea sulfate |
| 35 | Biuret |
| 36C | none |
| 37C | Rhenofit UE |
| 38 | Urea sulfate |
| 39 | Ammonium sulfate |
| 40 | Hydrazine sulfate |
| 41 | Dimethylguanidine sulfate |
| 42 | Rhenofit 1987 |

TABLE 14

| Example No. | Max. Torque lbf. in. | Rheometer, Micro die, 3° arc 100 cpm, 175° C. (ASTM-D2084) | |
|---|---|---|---|
| | | $T_2$, min. | $T_{90}$, min. |
| 27C | 33 | 1.3 | 3.3 |
| 28 | 49 | 2 | 20.4 |
| 29 | 45 | 2 | 11.4 |
| 30 | 52 | 2.1 | 20.4 |
| 31 | 54 | 2.1 | 20.9 |
| 32 | 39 | 1.4 | 15.4 |
| 33 | 33 | 1.4 | 5.5 |
| 34 | 40 | 2.0 | 10.3 |
| 35 | 35 | 1.5 | 9.9 |
| 36C | 31 | 1.4 | 13.1 |
| 37 | 41 | 2.2 | 14.6 |
| 38 | 45 | 1.9 | 13.8 |
| 39 | 30 | 1.2 | 12.9 |
| 40 | 33 | 1.2 | 14.2 |
| 41 | 30 | 1.3 | 14.5 |
| 42 | 42 | 2.2 | 16.1 |

Figure 8:
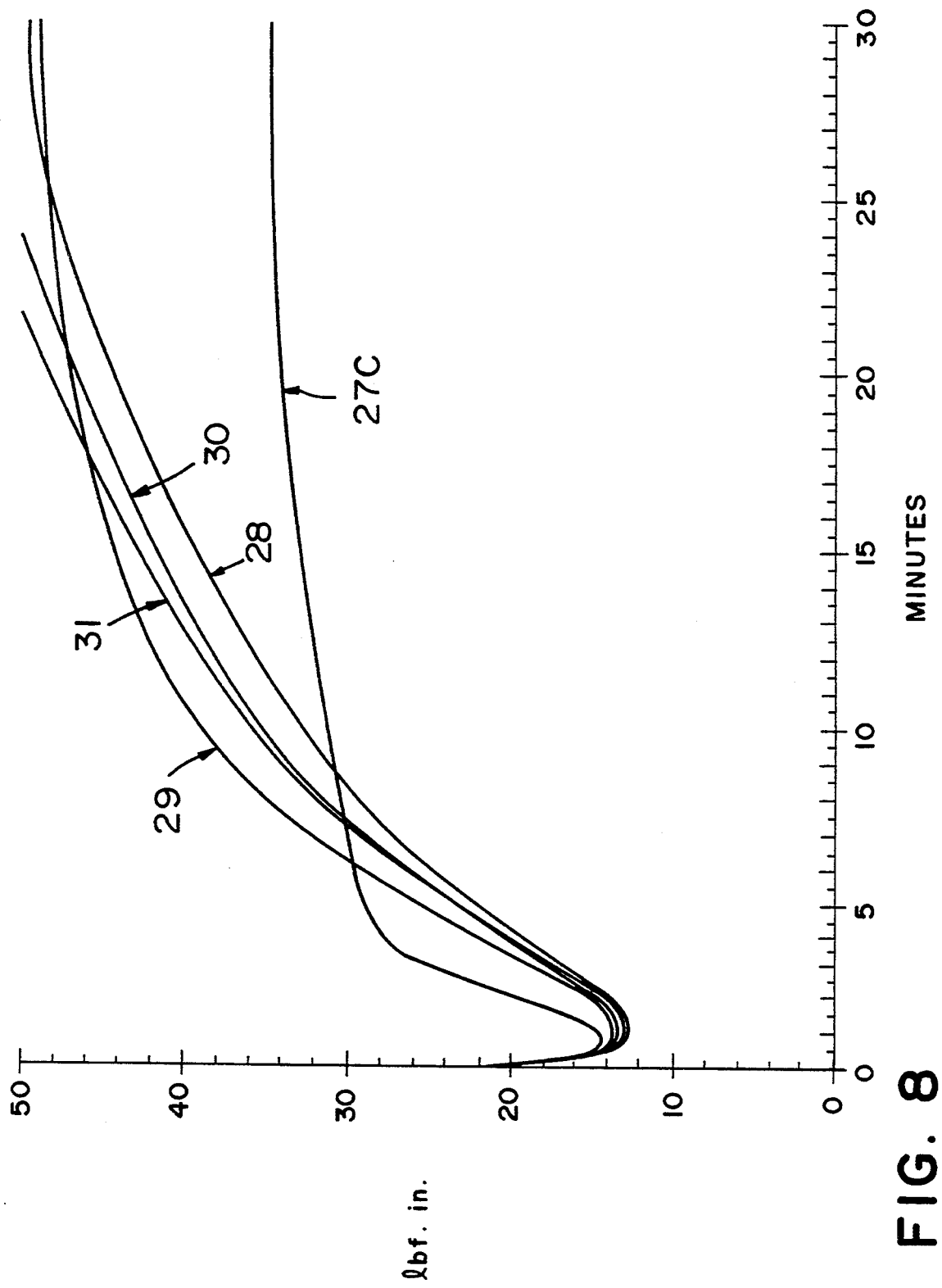
FIG. 8 is an oscillating disc rheometer curve (run at 175° C. at a 3° arc) illustrating torque as a function of cure time for the rubber blends of Examples 27C and 28–31.
Figure 9:
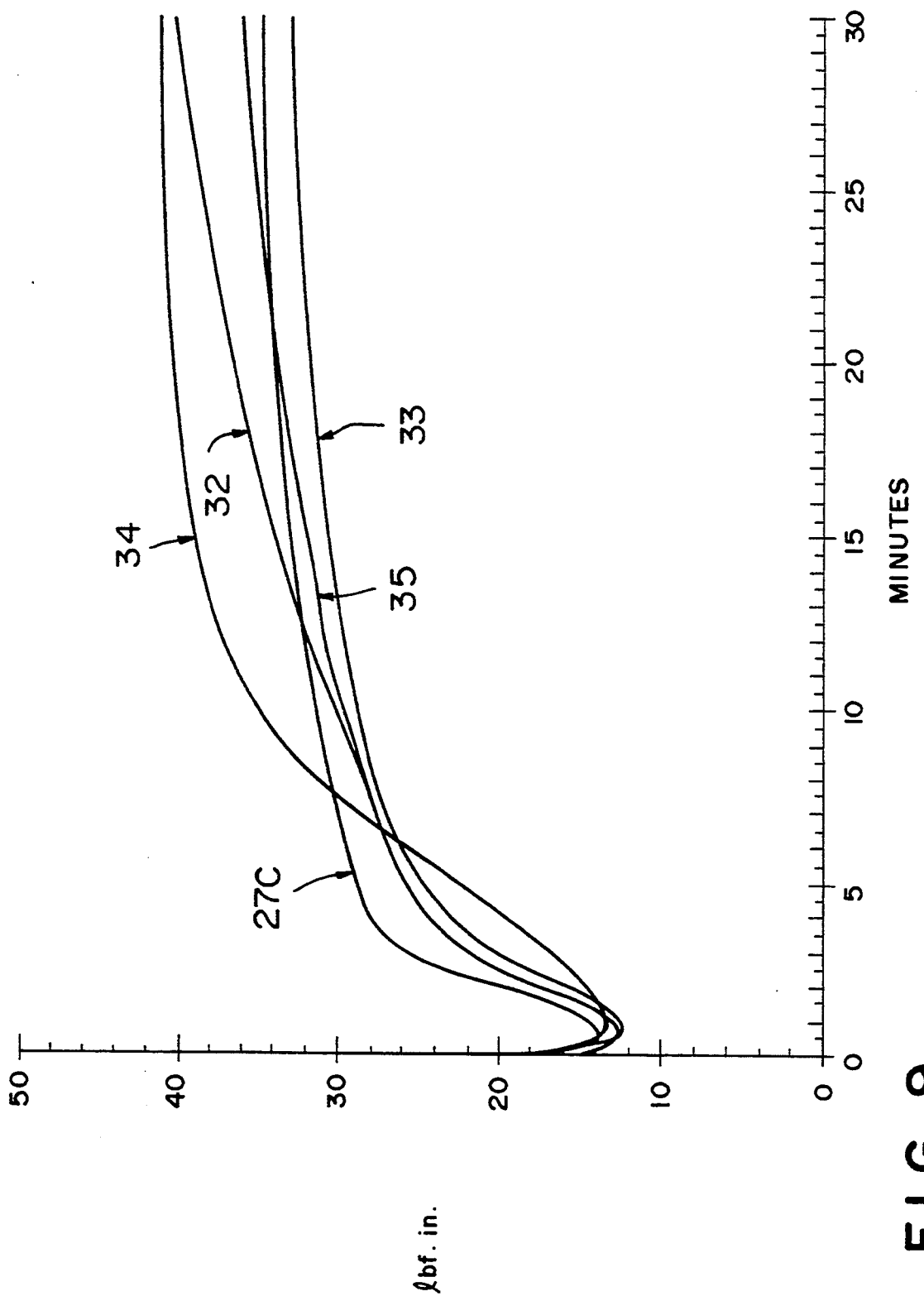
FIG. 9 is an oscillating disc rheometer curve (run at 175° C. at a 3° arc) illustrating torque as a function of cure time for the rubber blends of Examples 27C and 32–55.
Figure 10:
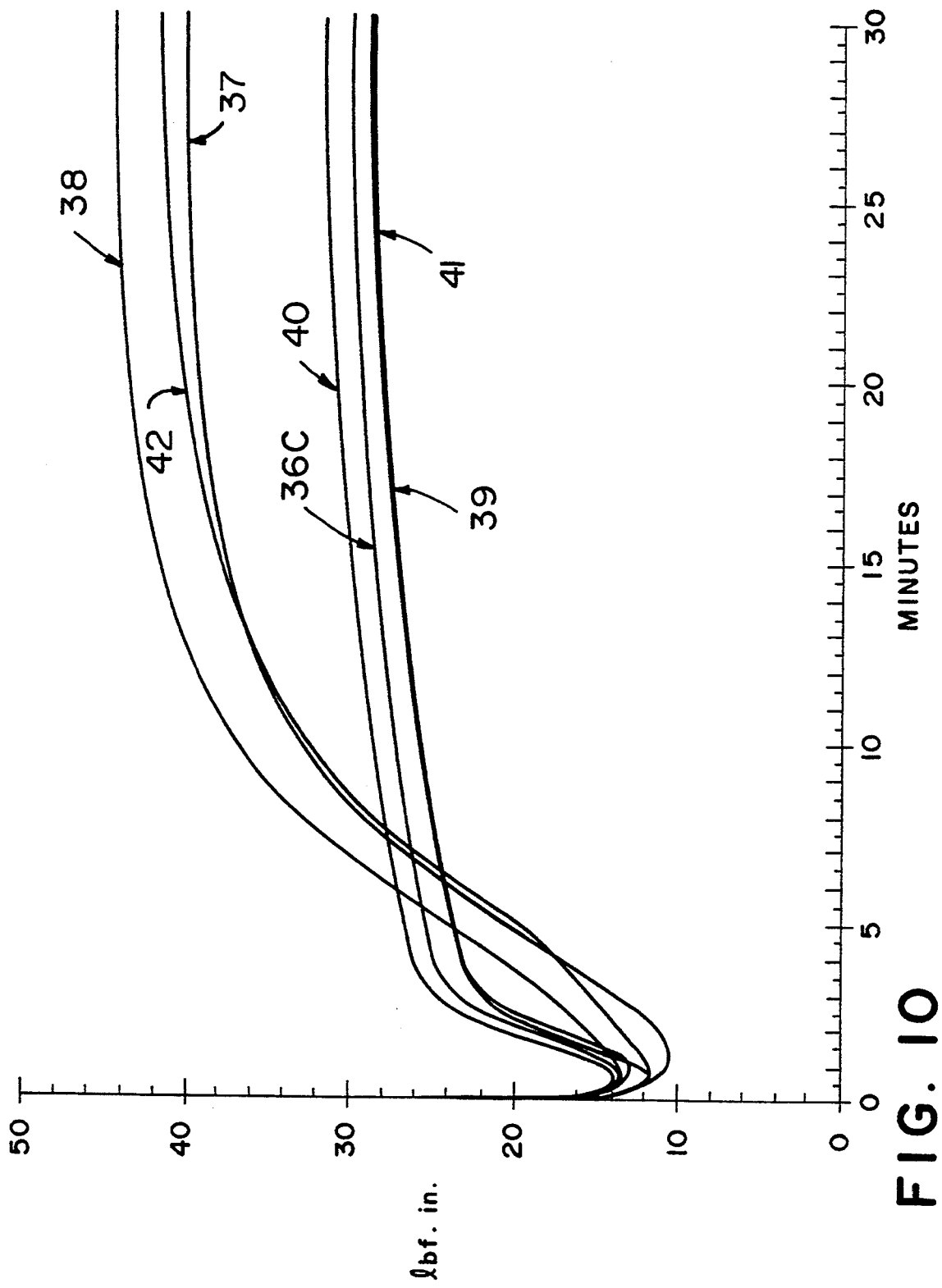
FIG. 10 is an oscillating disc rheometer curve (run at 175° C. at a 3° arc) illustrating torque as a function of cure time for the rubber blends of Examples 36C, 37, 38, 39, 40, 41 and 42.

With reference to FIGS. 8-10, it can be seen that the rheometer test data (Table 14), plotted as torque (pounds force x inches) versus time (minutes) at 175° C. indicates that the rubber blend cured in the presence of a cure system comprising components (a)-(c) and (e) of the present invention, i.e. without any urea component (d) (Example 27C), had less scorch safety, cured more rapidly during the initial few minutes and then leveled off such that the degree of crosslinking after 30 minutes was significantly lower than the blends which contained Redimix 926 (Example 28), Rhenofit UE (Example 29), BIK-OT (Example 30), Dynamide (Example 31), urea sulfate (Example 34) and Rhenofit 1987 (Example 42).

The data also show that the blend which contained urea as part of the cure system (Example 32) resulted in a somewhat higher degree of crosslinking after 30 minutes and a moderate change in the slope of the rheometer curve during the initial minutes of cure when compared to the blend having no urea component in its cure system (Example 27C). The data also show that the blends containing urea phosphate (Example 33), biuret (Example 35), ammonium sulfate (Example 39), hydrazine sulfate (Example 40) and dimethylguanidine sulfate (Example 41) cure at essentially the same rate and to the same degree as the blend containing no urea component (Example 27C). Accordingly, the data indicate that blends of chlorobutyl/epihalohydrin rubber can be cured at a relatively slow initial cure rate, with good scorch safety, and to a desirably high degree of crosslinking by employing a cure system comprising (a) sulfur, (b) a sulfur accelerator (c) a zinc-containing promoter such as zinc oxide, (d) a urea component such as urea, Redimix 926, Rhenofit UE, Rhenofit 1987, BIK-OT, Dynamide or urea sulfate, and optionally, (e) a di- or tri-mercapto compound such as 2,4,6-trimercapto-1,3,5-triazine.

EXAMPLES 43C-57C

Figure 11:
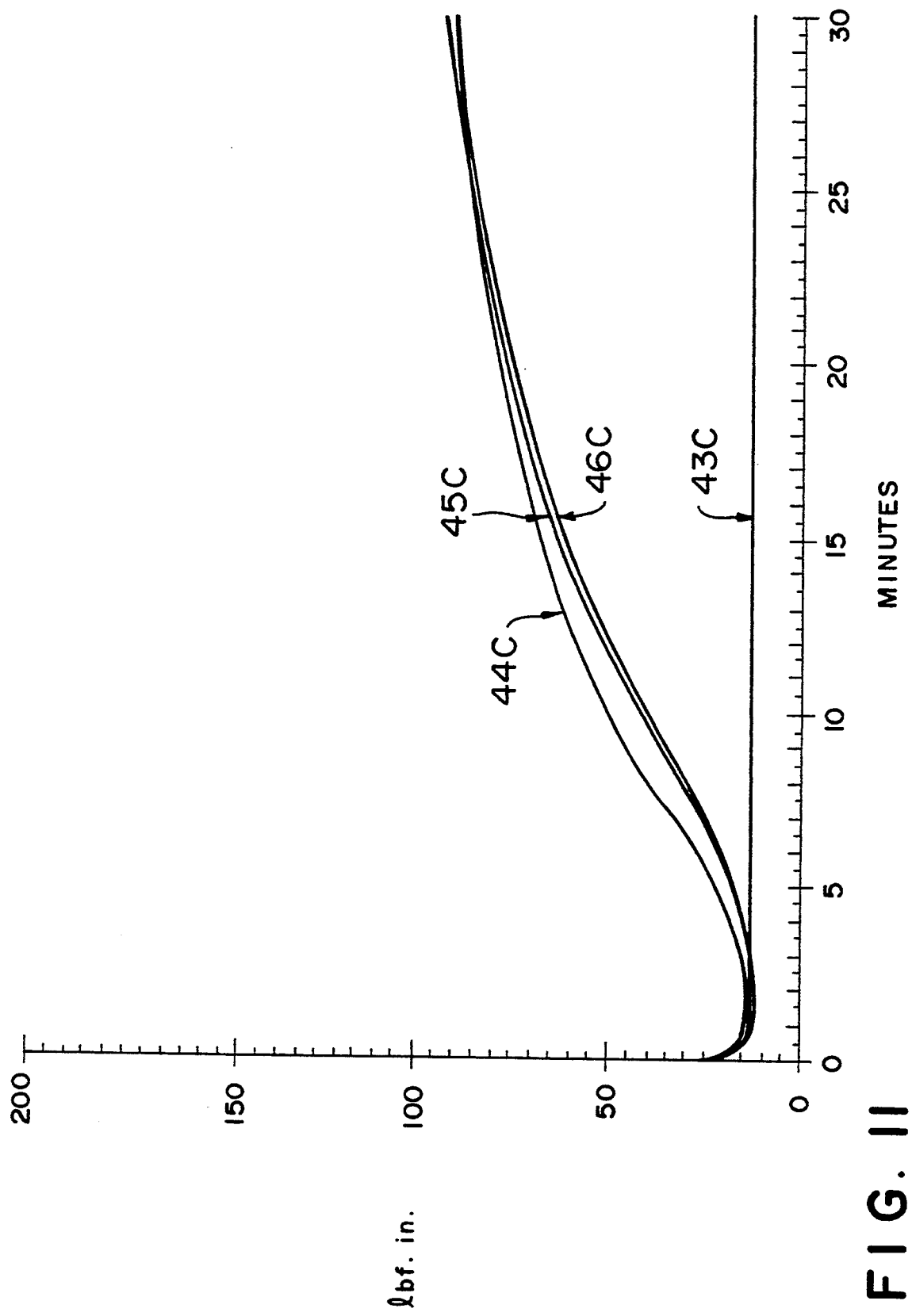
FIG. 11 is an oscillating disc rheometer curve (run at 175° C. at a 3° arc) illustrating torque as a function of cure time for the rubber blends of Examples 43C–46C.
Figure 12:
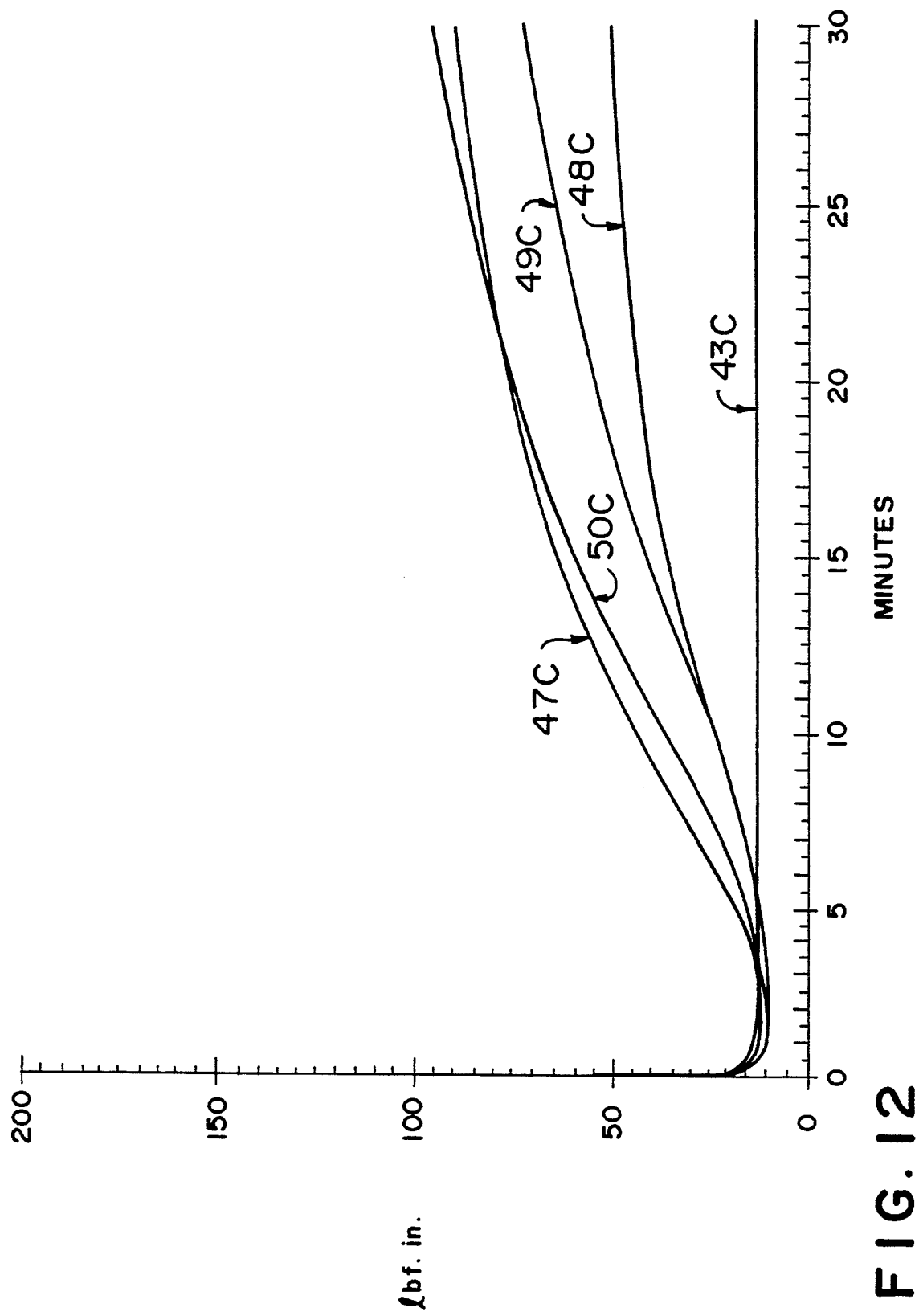
FIG. 12 is an oscillating disc rheometer curve (run at 175° C. at a 3° arc) illustrating torque as a function of cure time for the rubber blends of Examples 43C and 47C–50C.
Figure 13:
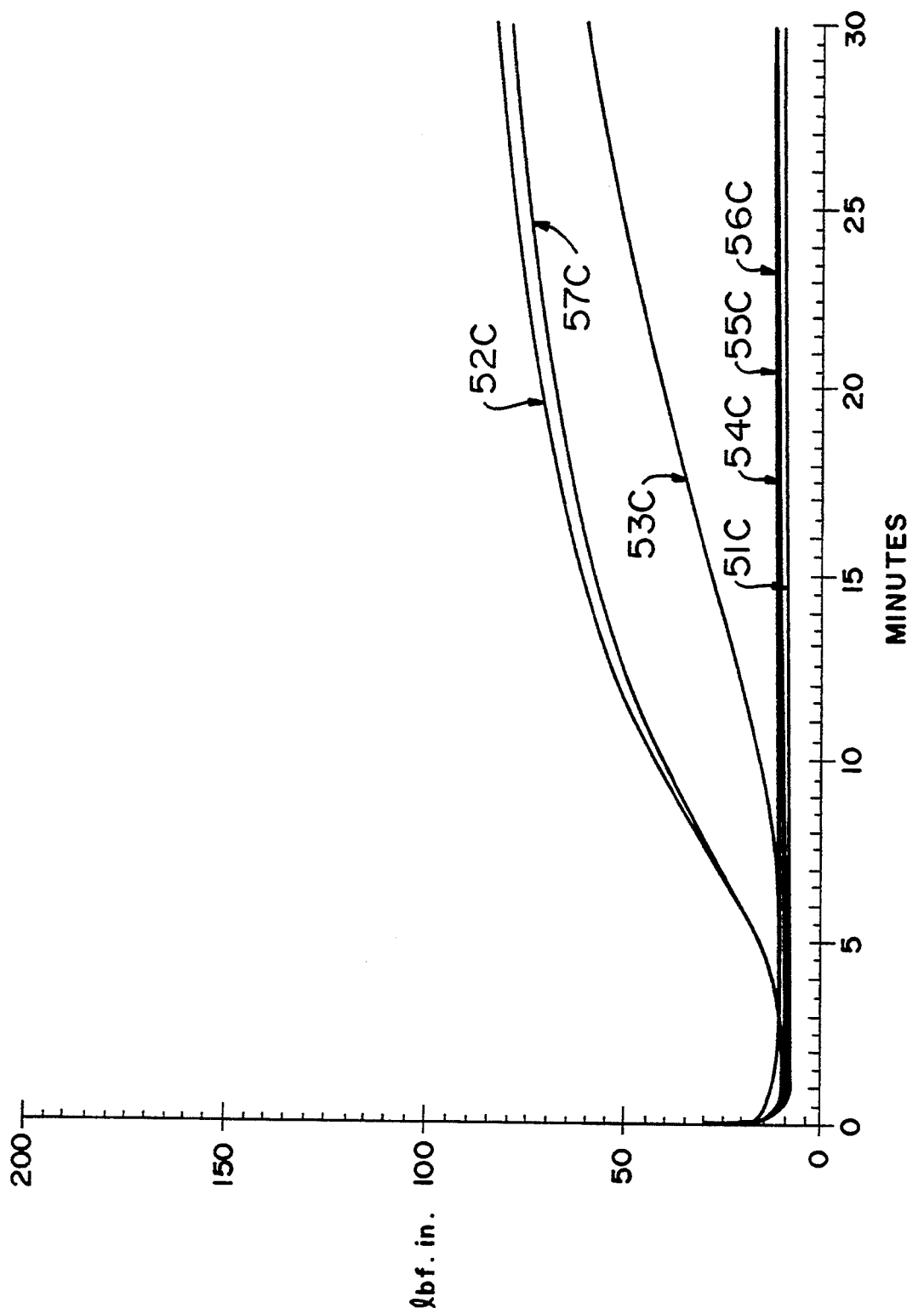
FIG. 13 is an oscillating disc rheometer curve (run at 175° C. at a 3° arc) illustrating torque as a function of cure time for the rubber blends of Examples 51C–57C.

Master batches of epichlorohydrin rubber, together with various cure systems were prepared. The various master batches were crosslinked by heating at 160° C. for 30 minutes and the rate and degree of crosslinking were monitored. The composition of the various master batches and test results are set forth in Tables 15, 16 and 17 and the test data is illustrated in FIGS. 11, 12 and 13.

TABLE 15

| Components | Example No, parts by weight | | | | | | | |
|---|---|---|---|---|---|---|---|---|
| | 43C | 44C | 45C | 46C | 47C | 48C | 49C | 50C |
| Hydrin H | 100 | 100 | 100 | 100 | 100 | 100 | 100 | 100 |
| N660 | 45 | 45 | 45 | 45 | 45 | 45 | 45 | 45 |
| C(NBC)D70 | 1.4 | 1.4 | 1.4 | 1.4 | 1.4 | 1.4 | 1.4 | 1.4 |
| Stearic acid | 2 | 2 | 2 | 2 | 2 | 2 | 2 | 2 |
| Zisnet PFT | 1.2 | 1.2 | 1.2 | 1.2 | 1.2 | 1.2 | 1.2 | 1.2 |
| Rhenofit UE | 0 | 1 | 0 | 0 | 0 | 0 | 0 | 0 |
| BIK-OT | 0 | 0 | 1 | 0 | 0 | 0 | 0 | 0 |
| Dynamide | 0 | 0 | 0 | 1 | 0 | 0 | 0 | 0 |
| Urea | 0 | 0 | 0 | 0 | 1 | 0 | 0 | 0 |
| Urea phosphate | 0 | 0 | 0 | 0 | 0 | 1 | 0 | 0 |
| Urea sulfate | 0 | 0 | 0 | 0 | 0 | 0 | 1 | 0 |
| Biuret | 0 | 0 | 0 | 0 | 0 | 0 | 0 | 1 |
| Ammonium sulfate | 0 | 0 | 0 | 0 | 0 | 0 | 0 | 0 |
| Hydrazine sulfate | 0 | 0 | 0 | 0 | 0 | 0 | 0 | 0 |
| Dimethyl guanidine sulfate | 0 | 0 | 0 | 0 | 0 | 0 | 0 | 0 |
| Rhenofit 1987 | 0 | 0 | 0 | 0 | 0 | 0 | 0 | 0 |

TABLE 16

| Components | Example No, parts by weight | | | | | | |
|---|---|---|---|---|---|---|---|
| | 51C | 52C | 53C | 54C | 55C | 56C | 57C |
| Hydrin H | 100 | 100 | 100 | 100 | 100 | 100 | 100 |
| N660 | 45 | 45 | 45 | 45 | 45 | 45 | 45 |
| C(NBC)D70 | 1.4 | 1.4 | 1.4 | 1.4 | 1.4 | 1.4 | 1.4 |
| stearic acid | 2 | 2 | 2 | 2 | 2 | 2 | 2 |
| Zisnet PFT | 1.2 | 1.2 | 1.2 | 1.2 | 1.2 | 1.2 | 1.2 |
| Rhenofit UE | 0 | 1 | 0 | 0 | 0 | 0 | 0 |
| BIK-OT | 0 | 0 | 0 | 0 | 0 | 0 | 0 |
| Dynamide | 0 | 0 | 0 | 0 | 0 | 0 | 0 |
| Urea | 0 | 0 | 0 | 0 | 0 | 0 | 0 |
| Urea phosphate | 0 | 0 | 0 | 0 | 0 | 0 | 0 |
| Urea sulfate | 0 | 0 | 1 | 0 | 0 | 0 | 0 |
| Biuret | 0 | 0 | 0 | 0 | 0 | 0 | 0 |
| Ammonium sulfate | 0 | 0 | 0 | 1 | 0 | 0 | 0 |
| Hydrazine sulfate | 0 | 0 | 0 | 0 | 1 | 0 | 0 |
| Dimethyl guanidine sulfate | 0 | 0 | 0 | 0 | 0 | 1 | 0 |
| Rhenofit 1987 | 0 | 0 | 0 | 0 | 0 | 0 | 1 |

TABLE 17

| Example No. | Max. Torque lbf. in. | Rheometer, Micro die, 3° arc 100 cpm, 175° C. (ASTM-D2084) | |
|---|---|---|---|
| | | T₂, min. | T₉₀ min. |
| 43C | 12.7 | — | — |
| 44C | 89 | 2.4 | 21.4 |
| 45C | 92 | 2.8 | 23.8 |
| 46C | 91 | 2.9 | 22.5 |
| 47C | 89 | 2.6 | 22.0 |
| 48C | 50 | 4.4 | 22.3 |
| 49C | 73 | 4.2 | 23.0 |
| 50C | 96 | 3.9 | 24.4 |
| 51C | 14 | — | — |
| 52C | 83 | 3.0 | 22.8 |
| 53C | 60 | 5.6 | 26.6 |
| 54C | 13 | — | — |
| 55C | 11 | — | — |
| 56C | 13 | — | — |
| 57C | 80 | 3.2 | 23.0 |

With reference to FIGS. 11–13, it can be seen that urea, as well as tested urea derivatives, except for ammonium sulfate (Example 54C), hydrazine sulfate (Example 55C) and dimethylguanidine sulfate (Example 56C), functioned as a cure accelerator for the epichlorohydrin rubber.

EXAMPLES 58C–73C

Figure 14:
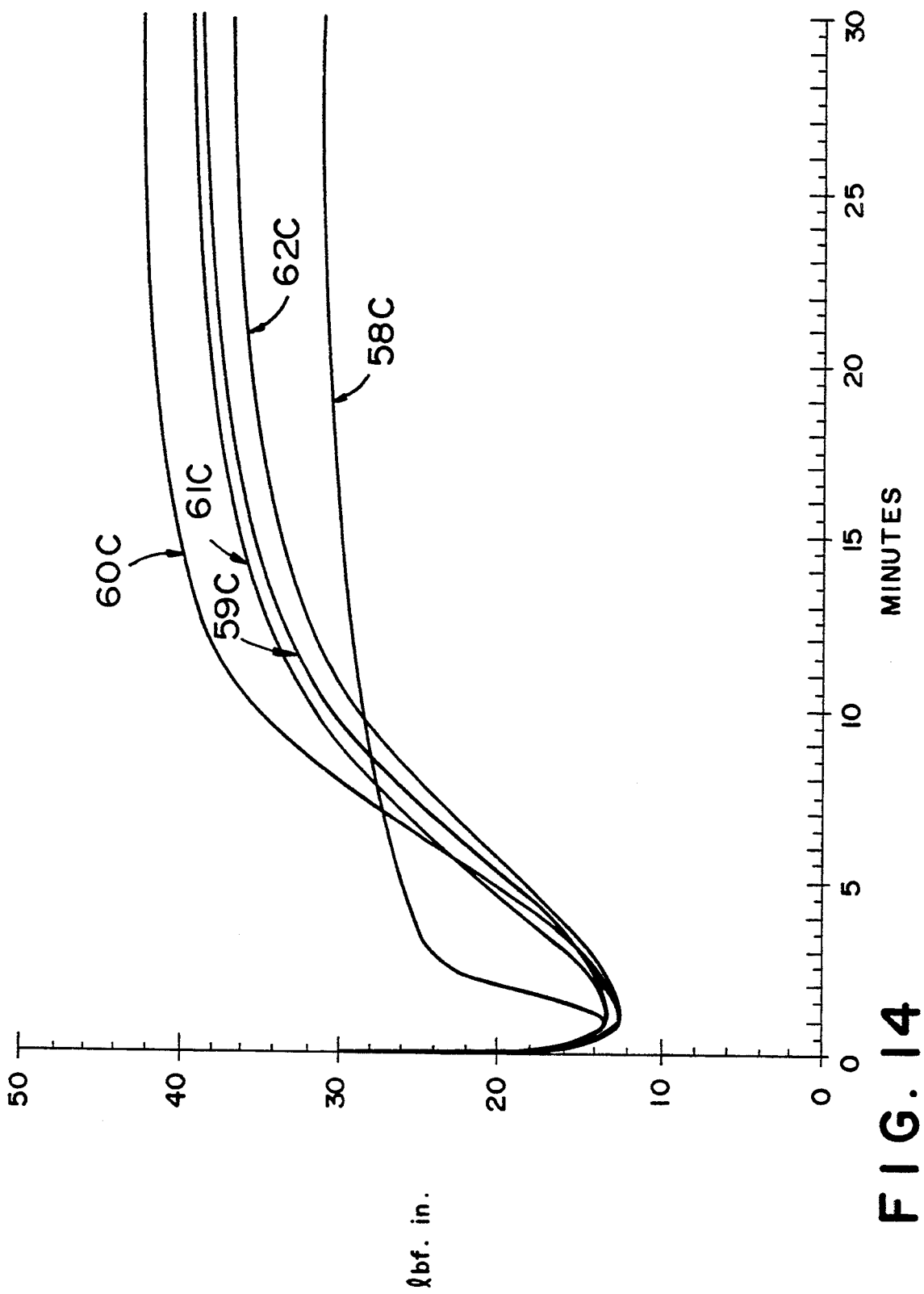
FIG. 14 is an oscillating disc rheometer curve (run at 175° C. at a 3° arc) illustrating torque as a function of cure time for the rubber blends of Examples 58C–62C.
Figure 15:
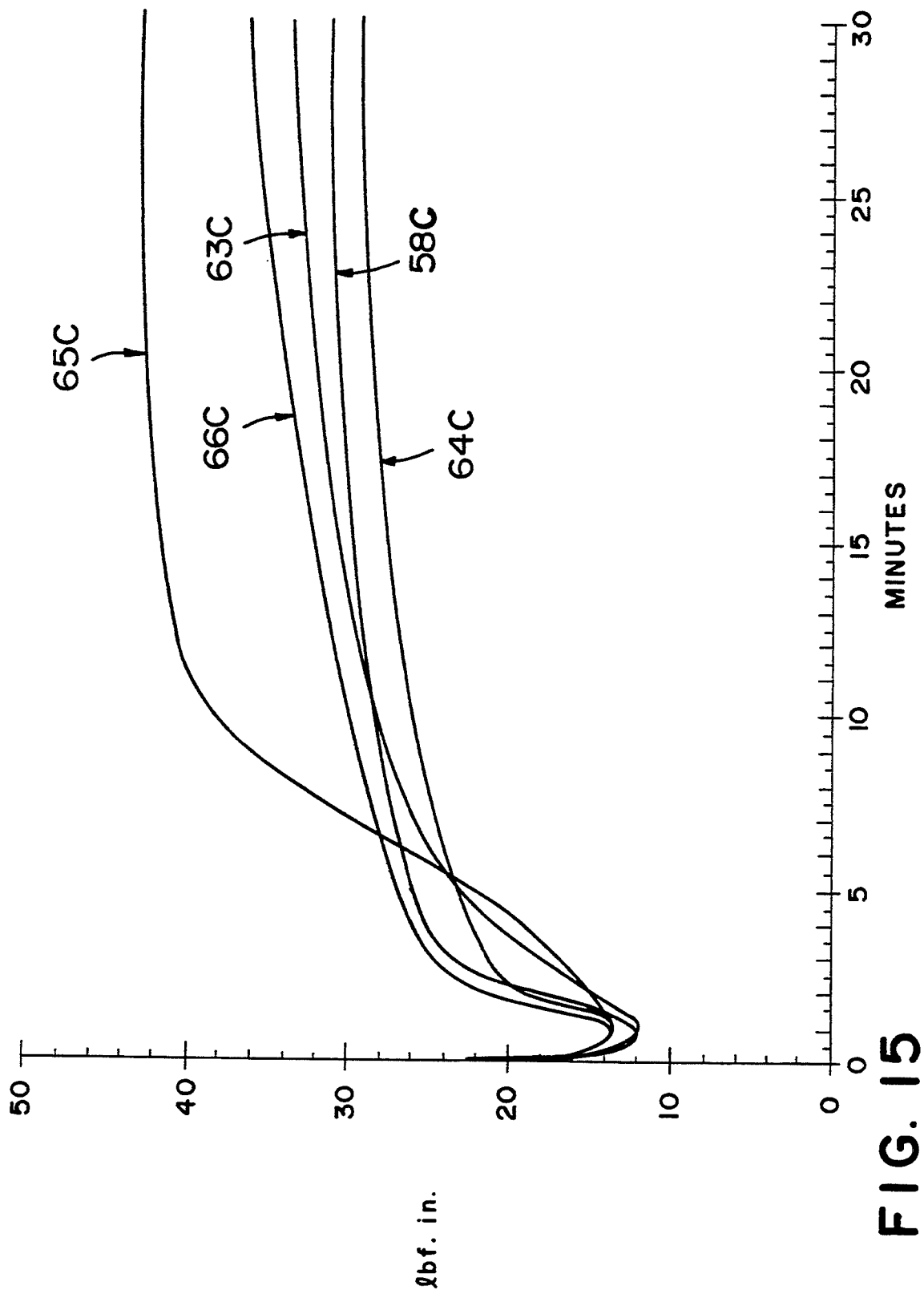
FIG. 15 is an oscillating disc rheometer curve (run at 175° C. at a 3° arc) illustrating torque as a function of cure time for the rubber blends of Examples 58C and 63C–66C.
Figure 16:
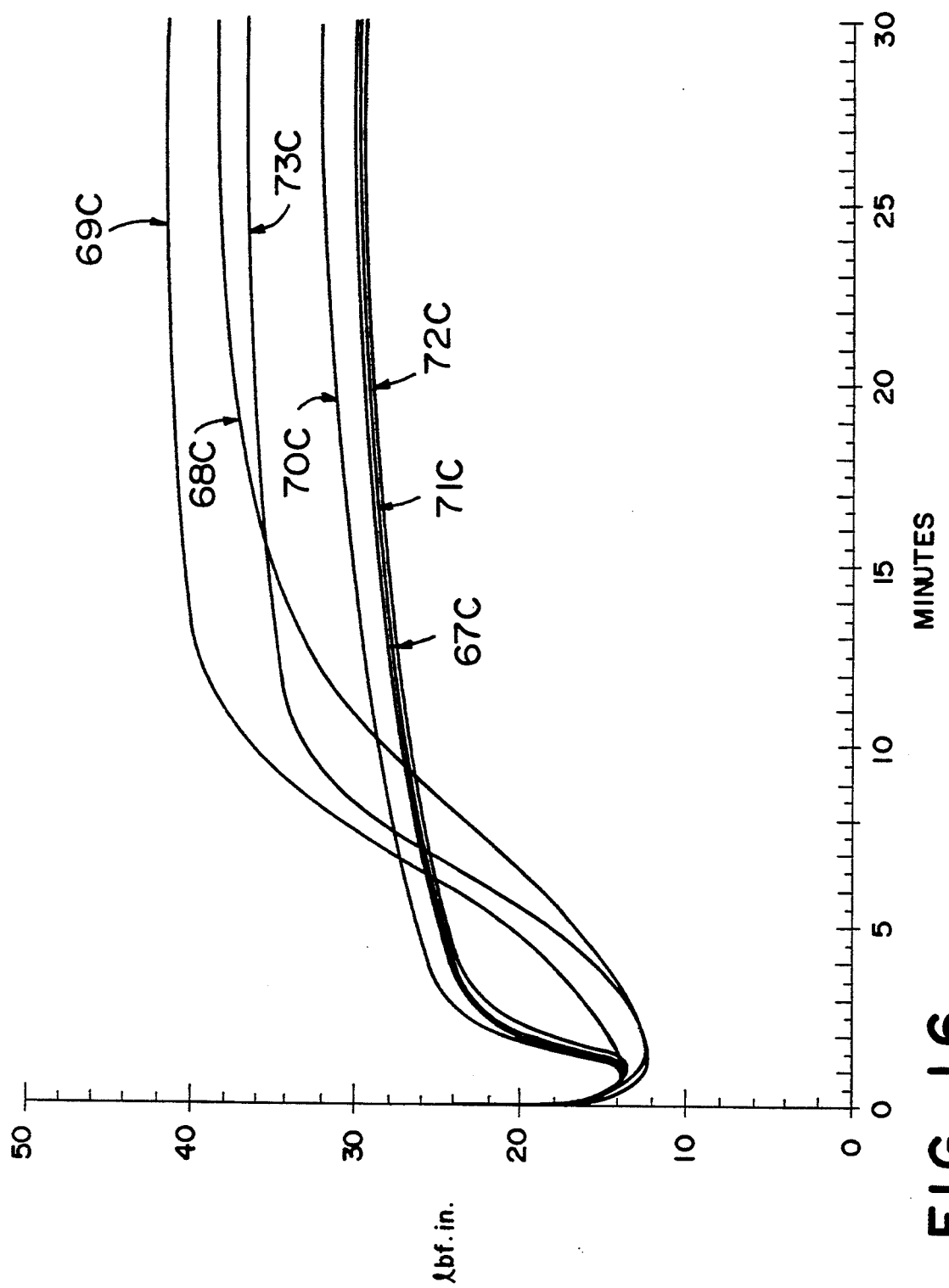
FIG. 16 is an oscillating disc rheometer curve (run at 175° C. at a 3° arc) illustrating torque as a function of cure time for the rubber blends of Examples 67C–73C.

A series of master batches of chlorobutyl rubber, together with various cure systems, was prepared. The various master batches were crosslinked by heating at 160° C. for 30 minutes and the rate and degree of crosslinking were monitored. The composition of the various master batches and test results are set forth in Tables 18, 19, 20 and 21 and the test data is illustrated in FIGS. 14, 15 and 16.

TABLE 18

| Components | 58C | 59C | 60C | 61C | 62C |
|---|---|---|---|---|---|
| Chlorobutyl HT-1066 | 100 | 100 | 100 | 100 | 100 |
| N660 | 40 | 40 | 40 | 40 | 40 |
| Dixie clay | 30 | 30 | 30 | 30 | 30 |
| Stearic acid | 1 | 1 | 1 | 1 | 1 |
| SP-1077 | 2 | 2 | 2 | 2 | 2 |
| Struktol 40 MS | 4 | 4 | 4 | 4 | 4 |
| ZnO | 3 | 3 | 3 | 3 | 3 |
| MBTS | 1.5 | 1.5 | 1.5 | 1.5 | 1.5 |
| Spider sulfur | 0.5 | 0.5 | 0.5 | 0.5 | 0.5 |
| Redimix 926 | 0 | 1 | 0 | 0 | 0 |
| Rhenofit UE | 0 | 0 | 1 | 0 | 0 |
| BIK-OT | 0 | 0 | 0 | 1 | 0 |
| Dynamide | 0 | 0 | 0 | 0 | 1 |
| Urea | 0 | 0 | 0 | 0 | 0 |
| Urea phosphate | 0 | 0 | 0 | 0 | 0 |
| Urea Sulfate | 0 | 0 | 0 | 0 | 0 |
| Biuret | 0 | 0 | 0 | 0 | 0 |
| Ammonium sulfate | 0 | 0 | 0 | 0 | 0 |
| Hydrazine sulfate | 0 | 0 | 0 | 0 | 0 |
| Dimethylguanidine sulfate | 0 | 0 | 0 | 0 | 0 |
| Rhenofit 1987 | 0 | 0 | 0 | 0 | 0 |

TABLE 19

| Components | 58C | 63C | 64C | 65C | 66C |
|---|---|---|---|---|---|
| Chlorobutyl HT-1066 | 100 | 100 | 100 | 100 | 100 |
| N660 | 40 | 40 | 40 | 40 | 40 |
| Dixie clay | 30 | 30 | 30 | 30 | 30 |
| Stearic acid | 1 | 1 | 1 | 1 | 1 |
| SP-1077 | 2 | 2 | 2 | 2 | 2 |
| Struktol 40 MS | 4 | 4 | 4 | 4 | 4 |
| ZnO | 3 | 3 | 3 | 3 | 3 |
| MBTS | 1.5 | 1.5 | 1.5 | 1.5 | 1.5 |
| Spider sulfur | 0.5 | 0.5 | 0.5 | 0.5 | 0.5 |
| Redimix 926 | 0 | 0 | 0 | 0 | 0 |
| Rhenofit UE | 0 | 0 | 0 | 0 | 0 |
| BIK-OT | 0 | 0 | 0 | 0 | 0 |
| Dynamide | 0 | 0 | 0 | 0 | 0 |
| Urea | 0 | 1 | 0 | 0 | 0 |
| Urea phosphate | 0 | 0 | 1 | 0 | 0 |
| Urea Sulfate | 0 | 0 | 0 | 1 | 0 |
| Biuret | 0 | 0 | 0 | 0 | 1 |
| Ammonium sulfate | 0 | 0 | 0 | 0 | 0 |
| Hydrazine sulfate | 0 | 0 | 0 | 0 | 0 |
| Dimethylguanidine sulfate | 0 | 0 | 0 | 0 | 0 |
| Rhenofit 1987 | 0 | 0 | 0 | 0 | 0 |

TABLE 20

| Components | 67C | 68C | 69C | 70C | 71C | 72C | 73C |
|---|---|---|---|---|---|---|---|
| Chlorobutyl HT-1066 | 100 | 100 | 100 | 100 | 100 | 100 | 100 |
| N660 | 40 | 40 | 40 | 40 | 40 | 40 | 40 |
| Dixie clay | 30 | 30 | 30 | 30 | 30 | 30 | 30 |
| Stearic acid | 1 | 1 | 1 | 1 | 1 | 1 | 1 |
| SP-1077 | 2 | 2 | 2 | 2 | 2 | 2 | 2 |
| Struktol 40 MS | 4 | 4 | 4 | 4 | 4 | 4 | 4 |
| ZnO | 3 | 3 | 3 | 3 | 3 | 3 | 3 |
| MBTS | 1.5 | 1.5 | 1.5 | 1.5 | 1.5 | 1.5 | 1.5 |
| Spider sulfur | 0.5 | 0.5 | 0.5 | 0.5 | 0.5 | 0.5 | 0.5 |
| Redimix 926 | 0 | 0 | 0 | 0 | 0 | 0 | 0 |
| Rhenofit UE | 0 | 1 | 0 | 0 | 0 | 0 | 0 |
| BIK-OT | 0 | 0 | 0 | 0 | 0 | 0 | 0 |
| Dynamide | 0 | 0 | 0 | 0 | 0 | 0 | 0 |
| Urea | 0 | 0 | 0 | 0 | 0 | 0 | 0 |
| Urea phosphate | 0 | 0 | 0 | 0 | 0 | 0 | 0 |
| Urea Sulfate | 0 | 0 | 1 | 0 | 0 | 0 | 0 |
| Biuret | 0 | 0 | 0 | 0 | 0 | 0 | 0 |
| Ammonium sulfate | 0 | 0 | 0 | 1 | 0 | 0 | 0 |
| Hydrazine sulfate | 0 | 0 | 0 | 0 | 1 | 0 | 0 |
| Dimethylguanidine sulfate | 0 | 0 | 0 | 0 | 0 | 1 | 0 |
| Rhenofit 1987 | 0 | 0 | 0 | 0 | 0 | 0 | 1 |

TABLE 21

| Example No. | Max. Torque lbf. in. | Rheometer, Micro die, 3° arc 100 cpm, 175° C. (ASTM-D2084) | |
|---|---|---|---|
| | | T₂, min. | T₉₀, min. |
| 58C | 32 | 1.4 | 11.5 |
| 59C | 41 | 2.3 | 15 |
| 60C | 43 | 2.4 | 13.4 |
| 61C | 40 | 2.0 | 15.6 |
| 61C | 40 | 2.5 | 21.2 |
| 63C | 34 | 1.7 | 14.7 |
| 64C | 30 | 1.4 | 13.3 |
| 65C | 43 | 2.0 | 11.1 |
| 66C | 37 | 1.5 | 18.9 |
| 67C | 30 | 1.4 | 12.5 |
| 68C | 39 | 2.6 | 15.2 |
| 69C | 42 | 2.0 | 11.3 |
| 70C | 32 | 1.3 | 13.9 |
| 71C | 30 | 1.4 | 12.0 |
| 72C | 30 | 1.4 | 14.7 |
| 74C | 37 | 2.6 | 10.9 |

With reference to FIGS. 14, 15 and 16, it can be seen that the addition to the cure system of Redimix 926

(Example 59C), Rhenofit UE (Example 60C), BIK-OT (Example 61C), Dynamide (Example 62C), urea sulfate (Example 65C) or Rhenofit 1987 (Example 73C) substantially improved scorch safety, retarded the rate of cure of the chlorobutyl master batches, and resulted in a significantly higher degree of crosslinking, when compared to the master batch containing a cure system consisting only of sulfur, MBTS and zinc oxide (Example 58C). The addition of urea (Example 63C) resulted in a retardation of the cure rate, but only a sight increase in the degree of crosslinking. The addition of biuret (Example 66C), urea phosphate (Example 64C), hydrazine sulfate (Example 71C) and dimethylguanidine sulfate (Example 72C) produced results which were very similar to those achieved using only the "control" cure system consisting of sulfur, MBTS and zinc oxide (Example 58C). The addition of ammonium sulfate (Example 70C) resulted in a very slight acceleration of the cure rate and a slight increase in the degree of crosslinking when compared to the "control" chlorobutyl composition (Example 58C).

Thus, as can be seen from the foregoing description, examples, tables and figures, this invention provides an economical crosslinking composition especially adapted for crosslinking blends of (a) halobutyl rubber or a mixture of halobutyl rubber and hydrocarbon backbone rubber, wherein the halobutyl rubber is at least 50% by weight of the mixture; and (b) epihalohydrin rubber. Rubber blends cured with the compositions of this invention exhibit an excellent balance of cure rate, degree of cure, scorch safety and physical properties, and exhibit excellent adhesion to the tire carcasses and excellent impermeability to gases. The cured rubber material is especially useful in tire inner tubes and tire inner liners, particularly in a pneumatic tire having cured rubber liner ply overlying all internal tire surfaces exposed in service to pressurized gas.

The expression "consists essentially of" and "consisting essentially of" as used in this specification and claims excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

Features, advantages and other specific embodiments of this invention will become readily apparent to those exercising ordinary skill in the art after reading the foregoing specification. In this regard, while specific embodiments of this invention have been described in considerable detail, variations and modifications of these embodiments can be effected without departing from the spirit and scope of the invention as disclosed and claimed.

What is claimed is:

1. A curable rubber composition comprising a blend of (A) from about 50 to 98 parts of a halobutyl rubber or a mixture of halobutyl rubber and hydrocarbon backbone rubber, wherein at least 50% by weight of the mixture is halobutyl rubber; and (B) from about 2 to 50 parts of an epihalohydrin rubber;

and a cure system, for each 100 parts by weight of the blend, consisting of:

(a) from about 0.1 to about 3 parts of sulfur;
(b) from about 0.3 to about 4 parts of a sulfur accelerator;
(c) from about 0.2 to about 10 parts of a zinc-containing promoter;
(d) from about 0.05 to about 5 parts of a vulcanization accelerator selected from the group consisting of urea, oil treated urea, a urea salt or a urea derivative; and
(e) up to about 5 parts of a di- or tri-mercapto nonsulfur curative material.

2. A curable rubber composition according to claim 1, wherein the halobutyl rubber is a chlorobutyl rubber or a bromobutyl rubber.

3. A curable rubber composition according to claim 2, wherein the halobutyl rubber is a chlorobutyl rubber.

4. A curable rubber composition according to claim 1, wherein the epihalohydrin rubber is an epichlorohydrin homopolymer, a epibromohydrin homopolymer or a copolymer of an epihalohydrin with less than 30% of an epoxymonomer.

5. A curable rubber composition according to claim 1, which contains from about 0.1 to about 3.5 parts of the vulcanization accelerator.

6. A curable rubber composition according to claim 1, wherein the vulcanization accelerator is a urea salt.

7. A curable rubber composition according to claim 6, wherein the urea salt is urea sulfate or a urea salt of an organic acid.

8. A curable rubber composition according to claim 1, wherein the sulfur accelerator is mercaptobenzothiazole or a derivative thereof, a sulfenamide, an alkyl dithiocarbamate, a dithiocarbamate salt, a thiuram or a thiuram sulfide.

9. A curable rubber composition according to claim 1, wherein the zinc-containing promoter is zinc oxide.

10. A curable rubber composition of claim 1, which contains from about 0.05 to about 3 parts of the nonsulfur curative material.

11. A curable rubber composition according to claim 1, wherein the nonsulfur curative material is 2,5-dimercapto-1,3,4-thiadiazole, 2-mercapto-1,3,4-thiadiazole-5-benzoate, 2,4,6-trimercapto-1,3,5-triazine, a dithiohydantoin, a dimercaptotriazole, a dithiotriazine or an ester of dithiotriazine.

12. A curable rubber composition according to claim 11, wherein the nonsulfur curative material is 2,4,6-trimercapto-1,3,5-triazine.

13. A curable rubber composition according to claim 1, wherein the cure system consists of about 0.2 to about 2.5 parts of sulfur, about 0.4 to about 3 parts of the sulfur accelerator, about 1 to about 5 parts of the zinc-containing promoter, 0.1 to about 3.5 parts of the vulcanization accelerator and about 0.05 to about 1 part of the nonsulfur curative material.

14. A process of curing a blend comprising (A) from about 50 to 98 parts of a halobutyl rubber or a mixture of halobutyl rubber and hydrocarbon backbone rubber, wherein at least 50% by weight of the mixture is halobutyl rubber, and (B) from about 2 to about 50 parts of a epihalohydrin rubber, which comprises heating the composition at a temperature of 100°-200° C. with a cure system, for each 100 parts by weight of the blend consisting of:

(a) from about 0.1 to about 3 parts of sulfur;
(b) from about 0.3 to about 4 parts of a sulfur accelerator;
(c) from about 0.2 to about 10 parts of a zinc-containing promoter;
(d) from about 0.05 to about 5 parts of a vulcanization accelerator selected from the group consisting of urea, oil treated urea, a urea salt or a urea derivative; and (e) up to about 5 parts di- or tri-mercapto nonsulfur curative material.

15. A process according to claim 14, wherein the halobutyl rubber is a chlorobutyl rubber or a bromobutyl rubber.

16. A process according to claim 15, wherein the halobutyl rubber is chlorobutyl rubber.

17. A process according to claim 14, wherein the epihalohydrin rubber is an epichlorohydrin homopolymer, a epibromohydrin homopolymer or a copolymer of an epihalohydrin with less than 30% of an epoxymonomer.

18. A process according to claim 14, wherein the cure system contains from about 0.1 to about 3.5 parts of the vulcanization accelerator.

19. A process according to claim 15, wherein the vulcanization accelerator is a urea salt.

20. A process according to claim 19, wherein the urea salt is urea sulfate or a urea salt of an organic acid.

21. A process according to claim 14, wherein the sulfur accelerator is mercaptobenzothiazole or a derivative thereof, a sulfenamide, an alkyl dithiocarbamate or dithiocarbamate salt, a thiuram or a thiuram sulfide.

22. A process according to claim 14, wherein the zinc-containing promoter is zinc oxide.

23. A process according to claim 14, wherein the cure system contains about 0.05 to about 3 parts of the nonsulfur curative material.

24. A process according to claim 14, wherein the nonsulfur curative is 2,5-dimercapto-1,3,4-thiadiazole, 2-mercapto-1,3,4-thiadizole-5-benzoate, 2,4,6-trimercapto-1,3,5-triazine, a dithiohydantoin, a dimercaptotriazole, dithiotriazine or an ester of dithiotriazine.

25. A process according to claim 24, wherein the nonsulfur curative is 2,4,6-trimercapto-1,3,5-triazine.

26. A process according to claim 14, wherein the cure system consists of about 0.2 to about 2.5 parts of sulfur, about 0.4 to about 3 parts of the sulfur accelerator, about 1 to about 5 parts of the zinc-containing promoter, 0.1 to about 3.5 parts of the vulcanization accelerator and about 0.05 to about 1 part of the nonsulfur curative material.

* * * * *